US011117744B1

(12) United States Patent
Medioni et al.

(10) Patent No.: US 11,117,744 B1
(45) Date of Patent: Sep. 14, 2021

(54) DETERMINATION OF UNTIDY ITEM RETURN TO AN INVENTORY LOCATION

(71) Applicant: AMAZON TECHNOLOGIES, INC., Seattle, WA (US)

(72) Inventors: Gerard Guy Medioni, Seattle, WA (US); Haichao Zhang, Seattle, WA (US); Saurabh Sehgal, Seattle, WA (US); Liefeng Bo, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/963,204

(22) Filed: Dec. 8, 2015

(51) Int. Cl.
  *G06F 7/00* (2006.01)
  *B65G 1/137* (2006.01)
  *G05B 15/02* (2006.01)
(52) U.S. Cl.
  CPC ............. *B65G 1/137* (2013.01); *G05B 15/02* (2013.01)
(58) Field of Classification Search
  None
  See application file for complete search history.

(56) References Cited

U.S. PATENT DOCUMENTS

| 7,225,980 B2 | 6/2007 | Ku et al. |
| 7,949,568 B2 | 5/2011 | Fano et al. |
| 8,009,864 B2 | 8/2011 | Linaker et al. |
| 8,189,855 B2 | 5/2012 | Opalach et al. |
| 8,630,924 B2* | 1/2014 | Groenevelt .......... G06Q 10/087 211/90.01 |
| 9,235,928 B2 | 1/2016 | Medioni et al. |
| 2009/0267772 A1 | 10/2009 | Dehnadi |
| 2011/0011936 A1* | 1/2011 | Morandi .................. G06K 9/00 235/454 |
| 2011/0228984 A1 | 9/2011 | Papke et al. |
| 2012/0284132 A1 | 11/2012 | Kim et al. |
| 2013/0284806 A1 | 10/2013 | Margalit |

(Continued)

FOREIGN PATENT DOCUMENTS

WO  WO2016051183  4/2016

OTHER PUBLICATIONS

Asthana, et al., "An indoor wireless system for personalized shopping assistance", CiteSeerX, in Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Yolanda R Cumbess
(74) *Attorney, Agent, or Firm* — Lindauer Law, PLLC

(57) ABSTRACT

A user may place an item at an inventory location in an incorrect location, such as the wrong lane on the shelf. An untidy score is generated that is indicative of whether an item is where it is supposed to be. A correct item verification (CIV) score is determined that is indicative of how similar the returned item is to the type of item that is supposed to be stored at that location. An invalid item recognition (IIR) score is determined that is indicative of similarity of the returned item to a set of items associated with the user, that set excluding the item that is supposed to be stored at that location. The CIV and the IIR are combined to generate an untidy score. Based on the untidy score, someone may be dispatched to clean up the inventory location.

22 Claims, 8 Drawing Sheets

(56) References Cited

U.S. PATENT DOCUMENTS

2014/0100769 A1* 4/2014 Wurman .............. G06Q 10/087
701/301
2015/0086107 A1 3/2015 Dedeoglu et al.

OTHER PUBLICATIONS

Kalnikaite, et al., "How to Nudge In Situ: Designing Lambent Devices to Deliver Information Salience in Supermarkets", ACM, in proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

Wang, et al., "Image Quality Assessment: From Error Visibility to Structural Similarity", IEEE Transactions on Image Processing, vol. 13, No. 4, April 2004. [retrieved on Oct. 22, 2015] Retrieved from Internet: <URL: http://www.cns.nyu.edu/pub/eero/wang03-reprint.pdf>.

Wang, et al., "On the Euclidean Distance of Images", [retrieved on Oct. 22, 2015] Retrieved from Internet: <URL: http://www.cis.pku.edu.cn/faculty/vision/wangliwei/pdf/IMED.pdf>.

* cited by examiner

DETERMINATION OF UNTIDY ITEM RETURN TO AN INVENTORY LOCATION

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
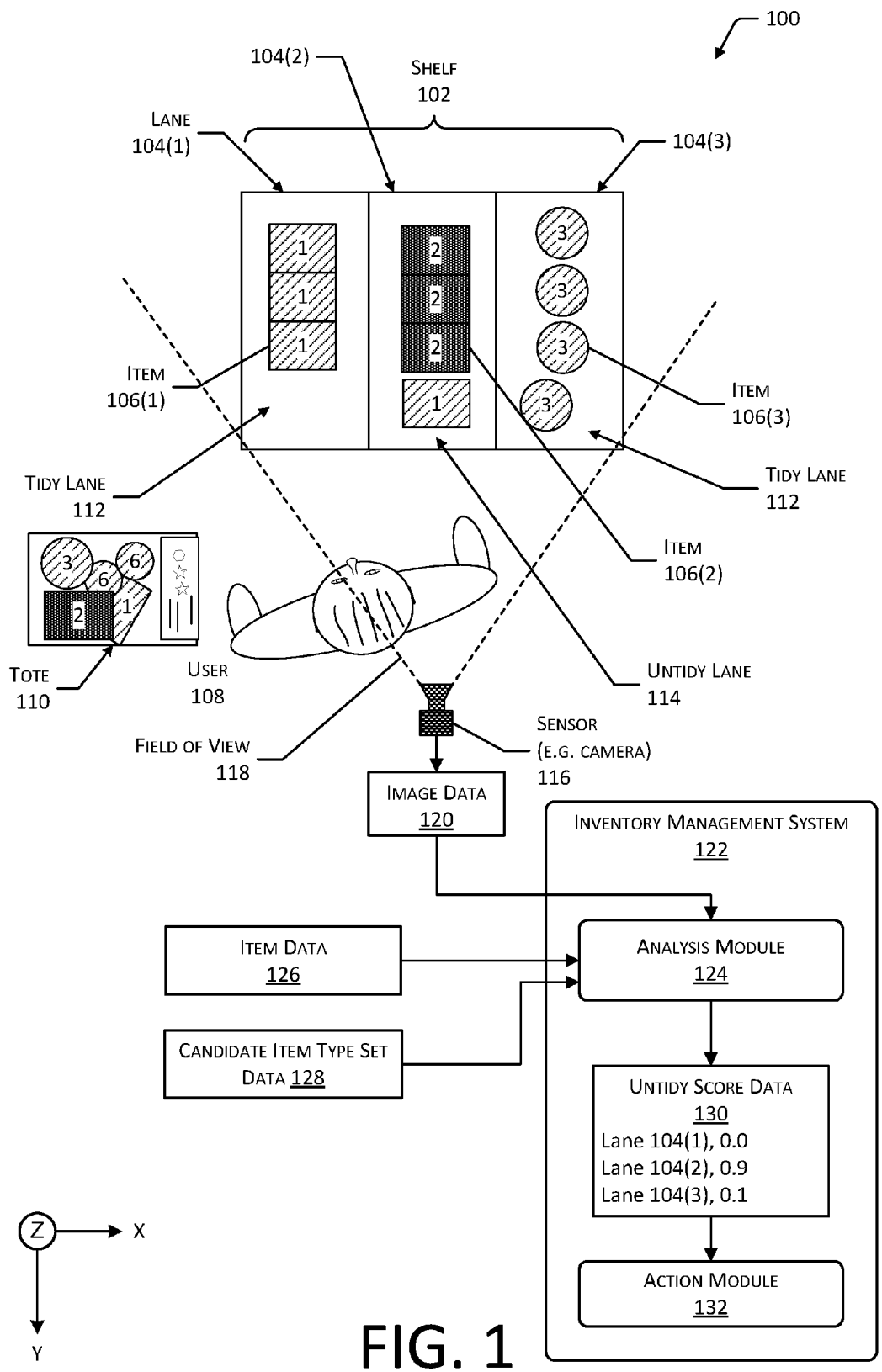
FIG. 1 illustrates a system to determine tidiness of a lane on a shelf, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for processing image data acquired from cameras to determine an untidy score. The untidy score is indicative of tidiness at an inventory location in a materials handling facility (facility). An inventory location may include shelves, hangers, and so forth, that hold or otherwise support a type of item. The inventory location may be arranged into sections, such as lanes on a shelf. For example, a shelf may have three lanes, with each lane holding a different type of item. A tidy inventory location is one in which the inventory location contains only the type of item associated with that inventory location, or portion thereof. An untidy inventory location is one in which an inventory location contains at least one of a type of item that is not associated with that inventory location.

The facility may include, or have access to, an inventory management system. The inventory management system may be configured to maintain information about items, users, condition of the facility, and so forth. For example, the inventory management system may maintain data indicative of a number of items at a particular inventory location, what items a particular user is ordered to pick, how many items have been picked or placed at the inventory location, requests for assistance, environmental status of the facility, and so forth.

Operation of the facility may be facilitated by using one or more sensors to acquire information about interactions in the facility. The inventory management system may process the sensor data from the one or more sensors to determine interaction data. For example, the inventory management system may use the interaction data to determine a type of item a user picked from a particular inventory location, to adjust the count of inventory stowed at the particular inventory location, and so forth.

During use of the facility, an item may be incorrectly placed in an inventory location. For example, a box of cat food may be placed in the lane associated with dog food. This results in a condition in which that lane is untidy. An untidy condition may result in errors. For example, the quantity on hand at a particular inventory location may be incorrectly determined, an interaction such as the user returning an item from a tote to the shelf at an incorrect location may result in incorrect billing to the user, and so forth.

Described in this application are techniques for determining an untidy score that is indicative of a likelihood as to whether an item has been placed in an incorrect inventory location (or portion thereof) in the facility. The untidy score is not necessarily indicative of the arrangement of the same type of item in a given inventory location. For example, an inventory location storing a single type of cat food may have the same untidy score whether or not the individual items are neatly arranged in a column or are in disarray.

One technique for determining the untidy score utilizes the determination of a correct item verification (CIV) score and an invalid item recognition (IIR) score. Image data may be acquired from a camera or other sensor with a field of view (FOV) that includes at least a portion of the inventory location. Cropped image data may be processed from the image data to highlight a region of interest (ROI), such as the front of a shelf at the inventory location. The cropped image data may be one or more of an image having fewer pixels than the original image data, include the image data with information indicative of a bounding box, and so forth. The image data may be acquired before, after, or before and after an event at the inventory location, such as placement of an item at the inventory location, motion at the inventory location, and so forth.

The CIV score is generated by determining the similarity between the cropped image data and previously stored item data about the type of item associated with the inventory location. A metric indicative of similarity between two images may be determined in several ways. For example, local descriptor values representative of portions of the cropped image data may be determined using algorithms such as the scale-invariant feature transform (SIFT) algorithm published by David Lowe, the speeded up robust features (SURF) algorithm published by Herbert Bay, Tinne Tuytelaars, and Luc Van Gool, and so forth. The local descriptor values of the cropped image data may be compared with previously generated local descriptor values stored with the item data. The CIV score provides a numeric value indicative of the similarity between the cropped image data and the previously stored data. In some implementations, the CIV score may comprise a confidence value associated with the output of an artificial neural network, one or more classifiers, and so forth.

The inventory management system may track which items are in the custody of the user, such as being carried in hand or within a tote in use by the user. This tracking may be based at least in part on one or more of the image data, weight data from weight sensors, three-dimensional data from depth sensors, tag identification data from near-field communication (NFC) readers, or other data from other sensors. Account item data provides information about those items that are in the custody of, or otherwise associated with, the user. For example, the account item data may provide a list that identifies each type of item and a quantity for each type of item that are in the user's tote.

A candidate item type set is determined using the account item data and information about what type of item is associated with the particular inventory location for which tidiness is being assessed. The candidate item type set comprises those types of items that are indicated by the account item data, but excludes the type of item associated with the particular inventory location for which the untidy score is to be generated. The candidate item type set thus includes those types of items that are in the custody of a user but excludes the type of item for the particular inventory location for which the untidy score is being calculated. For example, the account item data may indicate that the user has in their tote cat food, dog food, and fish food. If the untidy score is to be determined for the lane holding dog food, the candidate item type set includes only cat food and fish food.

A set of the IIR scores is generated using the candidate item type set. In one implementation, for each type of item in the candidate item type set, a score may be generated that is indicative of similarity between that type of item and the cropped image. For example, if the candidate item type set includes three different types of items, there would be three IIR scores, one for each type of item. Similar to the CIV score described above, determination of similarity may include the comparison of local descriptor values or using other techniques.

The IIR score associated with the item having the greatest similarity to that depicted in the cropped image may be determined. For example, where a numerically greater value indicates greater similarity, the IIR score for one of the types of item that is numerically largest may be deemed to be indicative of the greatest similarity.

The CIV score and the greatest IIR score may be used to generate the untidy score. In one implementation, the untidy score may be calculated as the difference between the greatest IIR score and the CIV score. The difference may be normalized to a value that is between 0 and 1. For example, the softmax function may be used to normalize the difference. Continuing the example, an untidy score of 0 may indicate that the inventory location is highly unlikely to have an improperly placed item, while an untidy score of 1 may indicate that the inventory location is highly likely to have an improperly placed item.

The untidy score may be analyzed with respect to a threshold value. Responsive to this analysis, the untidy score may be used to determine or trigger one or more actions. For example, the threshold value may indicate that an untidy score greater than or equal to 0.6 is deemed to indicate an untidy inventory location. Continuing the example, responsive to the untidy score being greater than the threshold value, subsequent data associated with the inventory location may be deemed to be unreliable, an attendant may be dispatched to correct the untidy situation, and so forth.

By generating and utilizing the untidy score, the inventory management system may improve operation of the facility. Events such as the improper placement by the user of an item onto the wrong shelf may be determined and corrected. As a result, errors resulting from improper placement may be mitigated. For example, information about events associated with the inventory location may be generated by an automated process. Untidy score data that indicates the inventory location is untidy may be used to reduce the confidence level of the output provided by the automated process. As a result of the reduced confidence level, the image data, output, and so forth, may be assessed by one or more of a human operator, more sophisticated automated process, and so forth.

By using the techniques described herein, operation of the facility may be improved. Details about interactions between users and items in the facility may be quickly and accurately determined. For example, as items are picked, placed, and so forth, information such as inventory levels based on changes in the count of items at the inventory locations may be readily and more accurately determined. As a result, the inventory management system may be able to quickly track what item a user has interacted with, maintain up-to-date inventory information, and so forth.

Illustrative System

FIG. 1 illustrates a system 100 to determine tidiness of an inventory location, such as a lane on a shelf, according to some implementations. A shelf 102 may include one or more lanes 104. The lanes 104 are an area upon the shelf 102 that is associated with a particular type of item 106. For example, the shelf 102 depicted here has three lanes 104(1), 104(2), and 104(3). Lane 104(1) may be associated with storing some quantity of item 106(1) such as cat food, while lane 104(2) may be associated with storing some quantity of item 106(2) such as dog food, and lane 104(3) may be associated with storing some quantity of item 106(3) such as fish food.

A user 108 may interact with the shelf 102 or the lanes 104 at the shelf 102. For example, the user 108 may remove item 106(1) from the lane 104(1) and place the item 106(1) into a tote 110. The tote 110 may be associated with the user 108 or that user's 108 user account. However, the user 108 may change their mind for any number of reasons and return the item 106(1) to the shelf 102. The user 108 may place the item 106(1) into one of the lanes 104 on the shelf 102. If the item 106 is returned to the lane 104 that is associated with that type of item 106, the lane 104 may be described as a tidy lane 112. Continuing the example, the user 108 may return item 106(1) to lane 104(1). Lane 104(1) may then be described as a tidy lane 112.

A tidy lane 112 may comprise a lane 104 for which only the one or more types of items 106 associated with that lane 104 are present. In comparison, an untidy lane 114 may comprise a lane 104 that is associated with one or more types of items 106, but at which an item 106 of another type has been placed.

The tidiness of a lane 104 may not necessarily be indicative of the arrangement or neatness on the shelf 102. For example, the lane 104(1) storing the cat food may have individual boxes of cat food that are more neatly arranged than the lane 104(3) storing fish food, but both may be deemed to be tidy lanes 112 because they contain only those types of items 106 that are associated with their respective lanes 104.

A sensor 116, such as a camera, may be positioned to gather information about the shelf 102 or other type of inventory location. The sensor 116 may have a field of view (FOV) 118 within which data may be acquired. The FOV 118 includes at least a portion of the shelf 102 or other type of inventory location. For example, a camera 116(1) may acquire image data 120, such as a picture of the lane 104(2). In some implementations, each lane 104 or group of lanes 104 may have a respective sensor 116 having a FOV that looks down or up at the particular lane 104. The image data 120 may comprise one or more still images, video, or a combination thereof.

An inventory management system 122 may access the image data 120 generated by the sensor 116. The inventory management system 122 may be configured, as described below, to perform various functions such as determining tidiness of the lane 104, tracking changes to a quantity on hand of the items 106 at the lane 104 based on sensor data provided by the sensors 116, and so forth.

The inventory management system 122 may include or have access to an analysis module 124. The analysis module 124 may access information including, but not limited to, item data 126, candidate item type set data 128, or other information.

The item data 126 provides information about a particular type of item 106, including characteristics of that type of item 106 such as physical dimensions, where that type of item 106 is located in the facility, characteristics about how the item 106 appears, and so forth. The item data 126 may indicate the types and quantities of items 106 that are expected to be stored at that particular inventory location such as in a particular lane 104 on a shelf 102, height of that type of item 106, weight of the item 106 individually or in aggregate, sample images of the type of item 106, and so forth. For example, the item data 126 may comprise a plurality of local descriptor values generated by feature extraction algorithms, parameters for classifiers, neural network configuration data, and so forth, that characterizes the appearance of a representative one or more of the item 106.

The item data 126 may include an item identifier. The item identifier may be used to distinguish one type of item 106 from another. For example, the item identifier may include a stock keeping unit (SKU) string, Universal Product Code (UPC) number, and so forth. The items 106 that are of the same type may be referred to by the same item identifier. For example, cans of beef flavor Brand X dog food may be represented by the item identifier value of "9811901181". In other implementations, non-fungible items 106 may each be provided with a unique item identifier, allowing each to be distinguished from one another.

The item data 126 may include one or more geometry data, item weight data, sample image data, or other data. The geometry data may include information indicative of size and shape of the item 106 in one, two, or three dimensions. For example, the geometry data may include the overall shape of an item 106, such as a cuboid, sphere, cylinder, and so forth. The geometry data may also include information such as length, width, depth, and so forth, of the item 106. Dimensional information in the geometry data may be measured in pixels, centimeters, inches, arbitrary units, and so forth. The geometry data may be for a single item 106, or a package, kit, or other grouping considered to be a single item 106.

The item weight data comprises information indicative of a weight of a single item 106, or a package, kit, or other grouping considered to be a single item 106. The item data 126 may include other data. For example, the other data may comprise weight distribution of the item 106, point cloud data for the item 106, and so forth.

The sample image data may comprise one or more images of one or more of that type of item 106. For example, sample image data may be obtained during processing or intake of the item 106 to be used by the facility.

The item data 126 may include one or more inventory location identifiers (IDs). The inventory location ID is indicative of a particular area or volume of an inventory location such as a shelf 102 that is designated for stowage of the type of item 106. For example, a single shelf 102 may have several lanes 104, each with a different inventory location ID. Each of the different inventory location IDs may be associated with a lane 104 having a particular area on the shelf 102 designated for storage of a particular type of item 106. A single type of item 106 may be associated with a particular inventory location ID, a plurality of inventory location IDs may be associated with the single type of item 106, more than one type of item 106 may be associated with the particular inventory location ID, and so forth.

The item data 126 may also include quantity data. The quantity data may comprise a count or value indicative of a number of items 106. The count may be a measured or an estimated value. The quantity data may be associated with a particular inventory location ID, for an entire facility, and so forth. For example, the same type of item 106 may be stored at different shelves 104 within the facility. The quantity data may indicate the quantity on hand for each of the different inventory locations.

The candidate item type set data 128 provides information indicative of the types of items 106 that are in the custody of, or otherwise associated with, the user 108 (or a user account affiliated with that user 108) but which excludes the type of item 106 associated with particular inventory location, such as a lane 104.

The analysis module 124 may utilize the image data 120, the item data 126, and the candidate item type set data 128 to generate untidy score data 130. The untidy score data 130 provides a value that is indicative of a likelihood that a particular inventory location is untidy. For example, a relatively low untidy score may indicate that a particular lane 104 is tidy, while a relatively high untidy score may indicate that a particular lane 104 is untidy. In this illustration, lane 104(2) has untidy score data 130 indicating a value of 0.9.

In some implementations, the untidy score data 130 may be compared or otherwise assessed with respect to threshold data. For example, the threshold data may specify that an untidy score value that is greater than or equal to 0.7 is indicative of an untidy lane 114. Lanes 104 that have untidy score values that are less than 0.7 may be deemed to be tidy lanes 112.

An action module 132 may initiate one or more actions based at least in part on the untidy score data 130. For example, the untidy score data 130 that indicates the particular lane 104 is an untidy lane 114 may trigger an action such as generation of a dispatch order for an attendant to go to the untidy lane 114 and correct the situation. In another example, the untidy score data 130 that indicates the particular lane 104 is an untidy lane 114 may be used to modify or alter the output of subsequent processing by the inventory management system 122. In one implementation, the confidence value or other indicia of accuracy as to the output of an automated process that is assessing data with respect to the untidy lane 114 may be decreased relative to a baseline value. For example, the confidence value of a count of items 106 on hand at the particular lane 104 that is deemed to be an untidy lane 114 may be designated as being unreliable. Once designated as unreliable, other subsequent actions may take place. For example, a human operator may be used to review sensor data or other information and try to determine the quantity on hand. In another example, sensor data associated with the subsequent action may be processed using different modules, techniques, workflows, and so forth.

In some implementations, the action module 132 may use information indicative of when information was acquired. For example, timestamps of the image data 120 may be used to determine a point in time when the lane 104 became an untidy line 114. The timestamps of data associated with the subsequent actions may then be used to determine when the confidence value should be decreased. For example, a process to identify items 106 picked from the lane 104 may be complete before the determination of the untidy score data 130 is completed. The subsequent actions may then be retroactively adjusted to have a lower confidence value. Continuing the example, the sensor data associated with the picking of the items may be reprocessed using techniques associated with handling data having a lower confidence value.

Operation of the analysis module 124 is described in more detail next with regard to FIG. 2.

Figure 2:
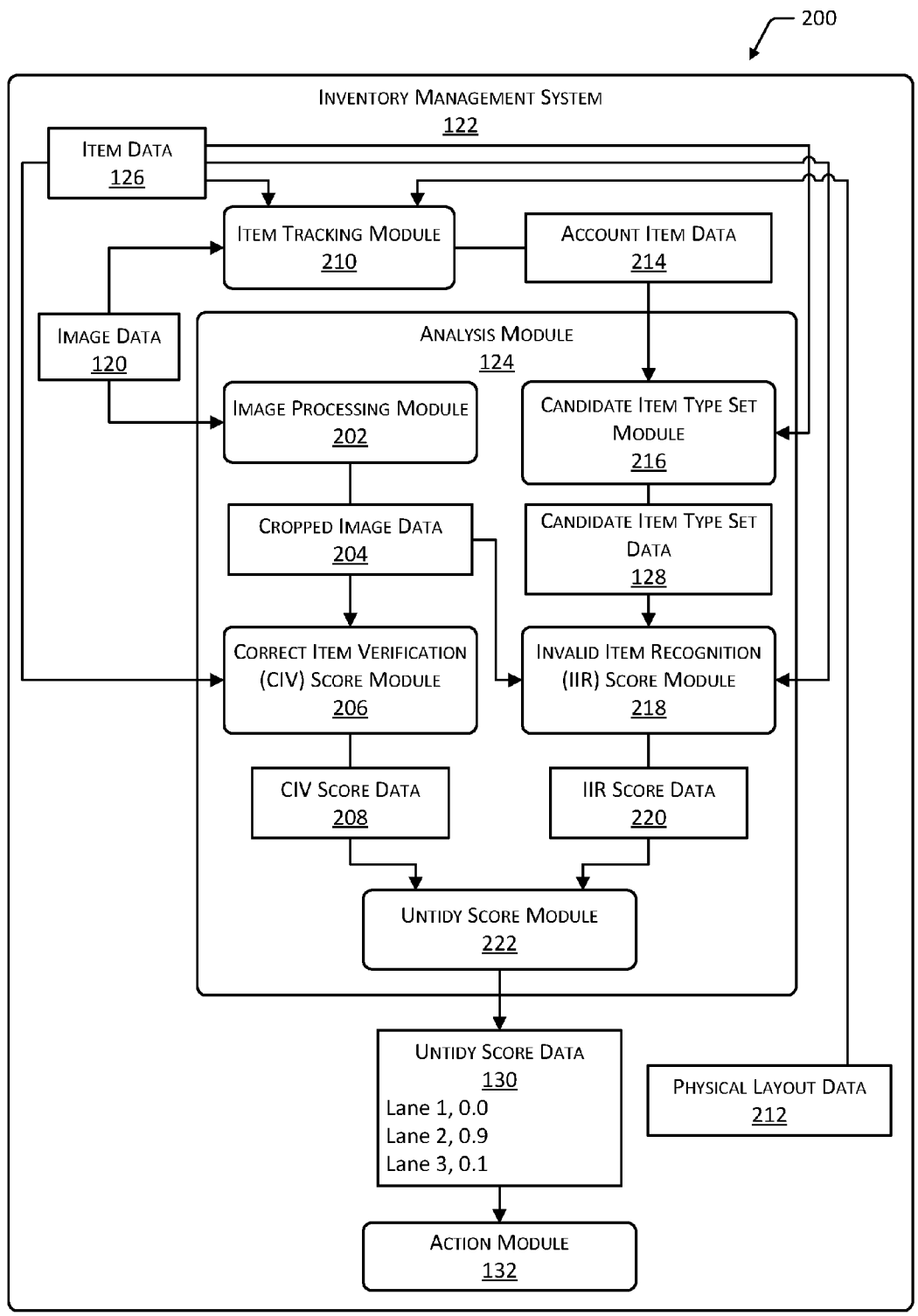
FIG. 2 illustrates additional details of the system, according to some implementations.

FIG. 2 illustrates additional details 200 of the system 100, according to some implementations. The analysis module 124 may access image data 120 obtained from one or more of the sensors 116. For example, the image data 120 may include one or more still images obtained of the lane 104, such as before and after the user 108 has placed an item 106 on the lane 104.

An image processing module 202 may process the image data 120. Processing of one or more of the image data 120 or portions thereof may be performed by implementing, at least in part, one or more of the following tools or techniques. In one implementation, processing of the image data 120 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data 120. In still another implementation, functions such as those in the Machine Vision Toolbox for Matlab (MVTB) available using MATLAB as developed by Math Works, Inc. of Natick, Mass., USA, may be utilized.

In some implementations, the image processing module 202 may be configured to generate cropped image data 204. The cropped image data 204 may comprise at least a portion of other image data 120. Cropped image data 204 may be processed from the image data 120 to highlight or otherwise designate a region of interest (ROI). For example, the ROI may be a front portion of the lane 104. The cropped image data 204 may be one or more of an image having fewer pixels than the original image data 120, include the image data 120 with information indicative of a bounding box, and so forth. For example, the cropped image data 204 may comprise a smaller image file that contains only the ROI. In another example, cropped image data 204 may comprise the entire image with a bounding box superimposed that designates the ROI. The image data 120 may be acquired before, after, or before and after an event at the inventory location, such as placement of an item 106 at the shelf 102 or other inventory location, motion at the shelf 102, and so forth.

A correct item verification (CIV) score module 206 may be used to generate CIV score data 208. The CIV score module 206 may use as input the cropped image data 204 and at least some of the item data 126. The CIV score data 208 is a value that is indicative of a similarity between the cropped image data 204 and the type of item 106 that is associated with a particular inventory location, such as a lane 104. The CIV score module 206 may determine the type of item 106 that is associated with a particular inventory location. For example, the item data 126 may be accessed to determine that item 106(2) is designated for storage at lane 104(2).

The CIV score module 206 may compare the cropped image data 204 with sample images, or information representative of the sample images, that correspond to the item 106 that is designated as being stored at that inventory location. Continuing the example above, the sample images or information representative of the sample images for the item 106(2) may be accessed and compared to the cropped image data 204.

Similarity between two or more images may be determined in a variety of ways. In one implementation, features in the images to be compared may be identified, and local descriptor values may be determined for those features. For example, the local descriptor value may comprise a value produced by the SIFT algorithm that was used to determine the presence of the particular feature in the image. A first set of the local descriptor values from the first image may then be compared with a second set of the local descriptor values. For example, the comparison may involve subtracting a value of one of the local descriptor values of the first set from one of the local descriptors of the second set that is associated with the same feature. The absolute value of a resulting difference may then be used to calculate a metric indicative of similarity.

In another implementation, similarity may be determined using an inner product function. For example, features of sample image data and other image data for comparison may be expressed as vector values. A maximum over the inner products of the vector values for the sample image data and the image data 120 undergoing comparison may be determined and used as a metric indicative of similarity.

Features represented in the images may be determined by using feature detection algorithms. The feature detection algorithms may include, but are not limited to, one or more of a maximally stable extremal regions (MESR) algorithm, a Harris affine region algorithm, an oriented FAST and rotated BRIEF (ORB) algorithm, a DAISY algorithm, a difference of Gaussian blob detector algorithm, a Laplacian of Gaussian blob detector algorithm, a determinant of Hessian blob algorithm, and so forth.

The algorithms to generate the local descriptor values may include, but are not limited to, one or more of a scale-invariant feature transform (SIFT) algorithm published by David Lowe, a gradient location and orientation histogram (GLOH), the speeded up robust features (SURF) algorithm published by Herbert Bay, Tinne Tuytelaars, and Luc Van Gool, a histogram of gradients algorithm (HOG), and so forth. In some implementations, the feature detection algorithms may be different from those used to generate the local descriptor values.

In some implementations, the same algorithm may detect the feature and generate the local descriptor values for each of the features that are detected in an image. For example, the SIFT algorithm may be used for feature detection and local descriptor value generation.

The local descriptor values may comprise information such as scalars, vectors, and so forth. The local descriptor values are indicative of one or more attributes of the particular portion of the object as presented in the images. For example, the local descriptor values may be descriptive of a particular gradient of the feature as it appears in the image.

By comparing the features and the local descriptor values between two or more images, a numeric value indicative of similarity between the images may be generated. In other implementations, other techniques to determine similarity may be used. For example, the Image Euclidean Distance (IMED) as promulgated by Liwei Wang, Yan Zhang, and Jufu Feng may be utilized to determine similarity between images.

An item tracking module 210 may access physical layout data 212 and generate account item data 214. The item tracking module 210 may be configured to determine a location within the facility, a user 108, a user account, and so forth, that is associated with one or more items 106. For example, the item tracking module 210 may determine that an item 106 has been removed from lane 104(1) and placed into the tote 110. The item tracking module 210 may then determine that the tote 110 is associated with the user 108 or the user account that represents the user 108.

The inventory management system 122 may utilize physical layout data 212. The physical layout data 212 may provide information indicative of where sensors 116 and inventory locations are in the facility with respect to one another, direction of the camera 116(1) relative to the inventory location, and so forth. For example, the physical layout data 212 may comprise information representative of a map or floor plan of the facility with relative positions of inventory locations, planogram data indicative of how items 106 are to be arranged at the inventory locations, and so forth.

The physical layout data 212 may associate a particular inventory location ID with other information such as physical location data, sensor position data, sensor direction data, sensor identifiers, and so forth. The physical location data provides information about where in the facility objects are, such as the inventory location, the sensors 116, and so forth. In some implementations, the physical location data may be relative to another object. For example, the physical location data may indicate that the camera 116(1) is associated with the lane 104(1).

The inventory management system 122 may utilize this information during operation. For example, the item tracking module 210 may utilize physical layout data 212 to determine what image data 120 acquired from particular cameras 116(1) corresponds to a particular shelf 102, lane 104, or other inventory location.

The item tracking module 210 may access information from sensors 116 within the facility, such as those onboard the tote 110 or carried by or worn by the user 108. For example, the item tracking module 210 may receive information from a radio frequency identification (RFID) reader that is indicative of tags associated with each of the items 106 that are placed within the tote 110.

The account item data 214 comprises information indicative of one or more items 106 that are within the custody of a particular user 108, within a particular tote 110, and so forth. For example, the account item data 214 may comprise a list of the contents of the tote 110. That list may be further associated with the user account representative of the user 108. In another example, the account item data 214 may comprise a list of items 106 that the user 108 is carrying.

A candidate item type set module 216 may use the account item data 214 to generate the candidate item type set data 128. For example, the candidate item type set module 216 may access the account item data 214 indicating a list of items 106 that the user 108 has in their tote 110. The candidate item type set module 216 may also access information indicative of the type of item 106 that is designated as being stowed in the item data 126 at the particular lane 104 for which untidy score data 130 is to be generated. The candidate item type set module 216 generates the candidate item type set data 128 that includes the types of items 106 that are within the custody of the user 108 but excludes the type of item 106 for the particular lane 104. This is illustrated in additional detail below with regard to FIG. 3.

An invalid item recognition (IIR) score module 218 may use as input the cropped image data 204, the candidate item type set data 128, and the item data 126 to generate a set of IIR score data 220. The IIR score data 220 is indicative of similarity between the cropped image data 204 and the individual types of items 106 that are specified by the candidate item type set data 128. For example, if the candidate item type set data 128 includes three different types of items 106, then the set of IIR score data 220 would include three different IIR scores. The similarity between the cropped image data 204 and the sample image data or information representative of the different types of items 106 that are stored within the item data 126 may be determined as described above with regard to the CIV score module 206. In some implementations, the same algorithm may be used to determine similarity with regard to CIV score data 208 and the IIR score data 220. In one implementation, the CIV score module 206 may represent each item 106 with a set of feature vectors. The sample image data of the item 106 may be accessed. The CIV score module 206 may generate the CIV score data 208 by computing as a maximum over the inner products between a feature set of the sample image data and a feature set of the image data 120 acquired from the camera 116(1).

From the set of IIR scores, the IIR score indicative of the greatest degree of similarity may be designated as the IIR score data 220. For example, where a greater numeric value of the IIR score indicates greater similarity, the particular IIR score that is numerically largest may be selected and designated as the IIR score data 220.

An untidy score module 222 may use the CIV score data 208 and the IIR score data 220 to generate the untidy score data 130. In one implementation, the untidy score may be calculated as the difference between the greatest IIR score and the CIV score. For example:

$$x \triangleq \text{greatest IIR score} - \text{CIV score} \qquad \text{Equation 1}$$

The CIV score data 208 and the IIR score data 220 may output numeric values that are representative of different ranges, different magnitudes, and so forth. In some implementations, the untidy score module 222 may use one or more functions to normalize the output. For example, the untidy score data 130 may be normalized to a value that is between 0 and 1. The normalization may implement the softmax function, such as:

$$\text{untidy score} = \frac{e^{ax}}{1 + e^{ax}} \qquad \text{Equation 2}$$

In this equation, x is as defined above, and a is a parameter chosen to maximize distinction between tidy and untidy conditions. The value of a may be determined by testing known tidy and known untidy conditions.

In some implementations, operation of the CIV score module 206 and the IIR score module 218 may be asynchronous with respect to one another. For example, the CIV score module 206 may operate to generate the CIV score data 208 prior to the generation of the IIR score data 220 by the IIR score module 218. In some implementations, the CIV score module 206 and the IIR score module 218 may operate contemporaneously with one another. For example, the modules may operate in parallel.

As described above, the untidy score data 130 may then be used by an action module 132 or other modules.

Figure 3:
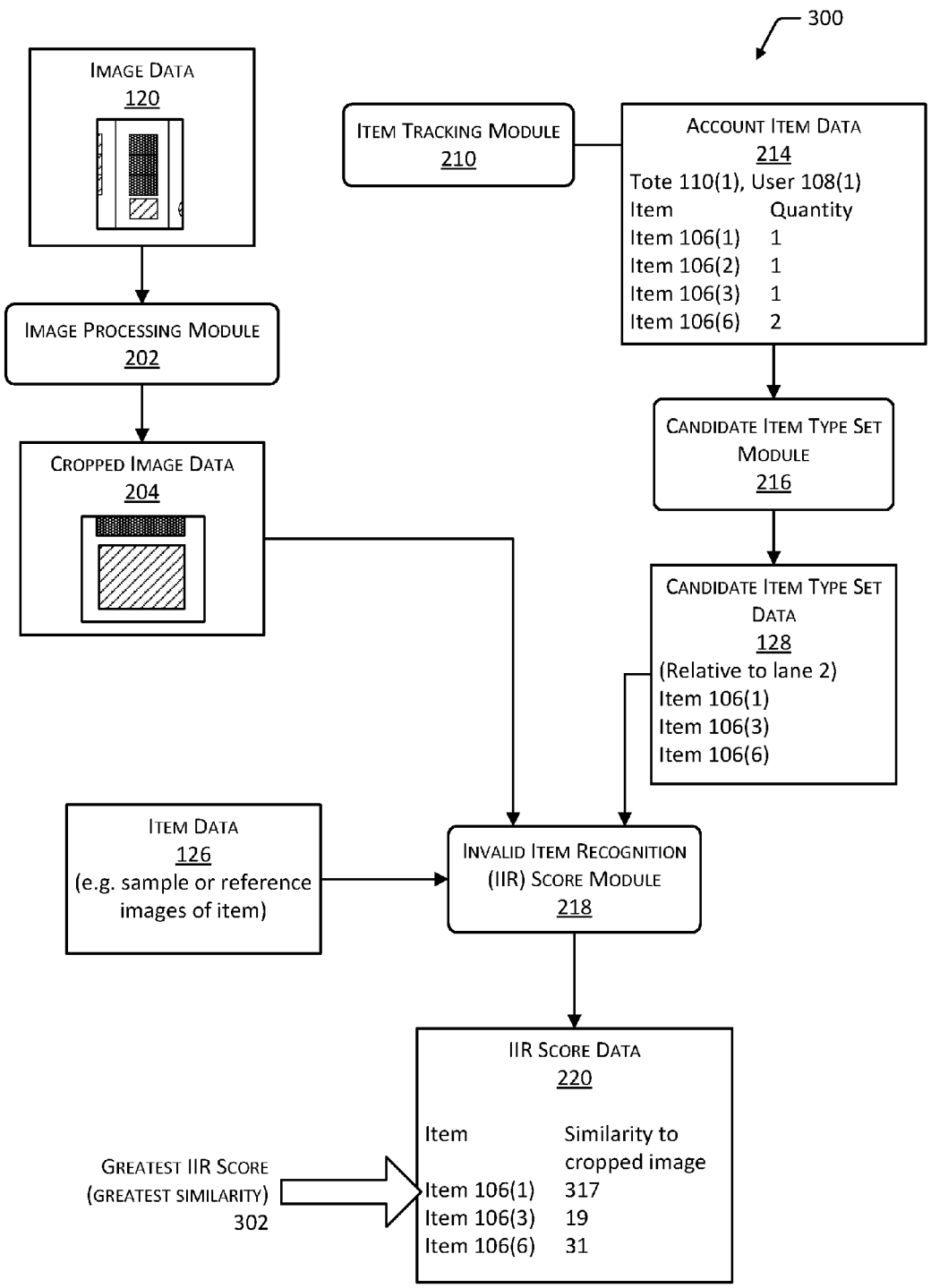
FIG. 3 is a flow diagram of the invalid item recognition portion of the system, according to some implementations.

FIG. 3 is a flow diagram 300 of the invalid item recognition portion of the system, according to some implementations. As described above, the image data 120 may comprise images of at least a portion of an inventory location such as a shelf 102. In this illustration, the image data 120 comprises a picture of the lane 104(2). The image processing module 202 may generate the cropped image data 204. In this illustration, the cropped image data 204 comprises that portion of the picture of the lane 104(2) that has exhibited a change. For example, the change may be the result of the placement of the item 106(1) in the lane 104(2).

As described above, the item tracking module 210 generates the account item data 214. As illustrated here, the account item data 214 includes information indicating that tote 110(1) is associated with user 108(1) and contains various types of items 106 at particular quantities. The candidate item type set module 216 uses the account item data 214 as described above to generate the candidate item type set data 128. As described above, the candidate item type set data 128 may comprise a list of the types of items 106 that are associated with or in the custody of the user 108, but excluding the type of item 106 associated with the particular inventory location. In this illustration, the type of item 106(2) that was present in the account item data 214 has been excluded from the candidate item type set data 128 because it is the type of item 106 associated with the lane 104(2).

The IIR score module 218 may use as input the cropped image data 204, the item data 126, and the candidate item type set data 128 to generate the IIR score data 220. As described above, a greatest IIR score 302 may be determined from scores for each of the types of item 106 that are in the candidate item type set data 128 that are indicative of a similarity between the cropped image data 204 and the item data 126 associated with the inventory location. In one implementation, the greatest IIR score 302 may comprise the IIR score having the largest numeric value in the set of scores calculated by the IIR score module 218. In this illustration, the type of item 106(1) is associated with the greatest IIR score 302 with a value of "317". The largest numeric value in this example indicates a greatest similarity of that item 106 as represented by the item data 126 to the cropped image data 204. As described below, the IIR score data 220 may comprise the greatest IIR score 302.

Figure 4:
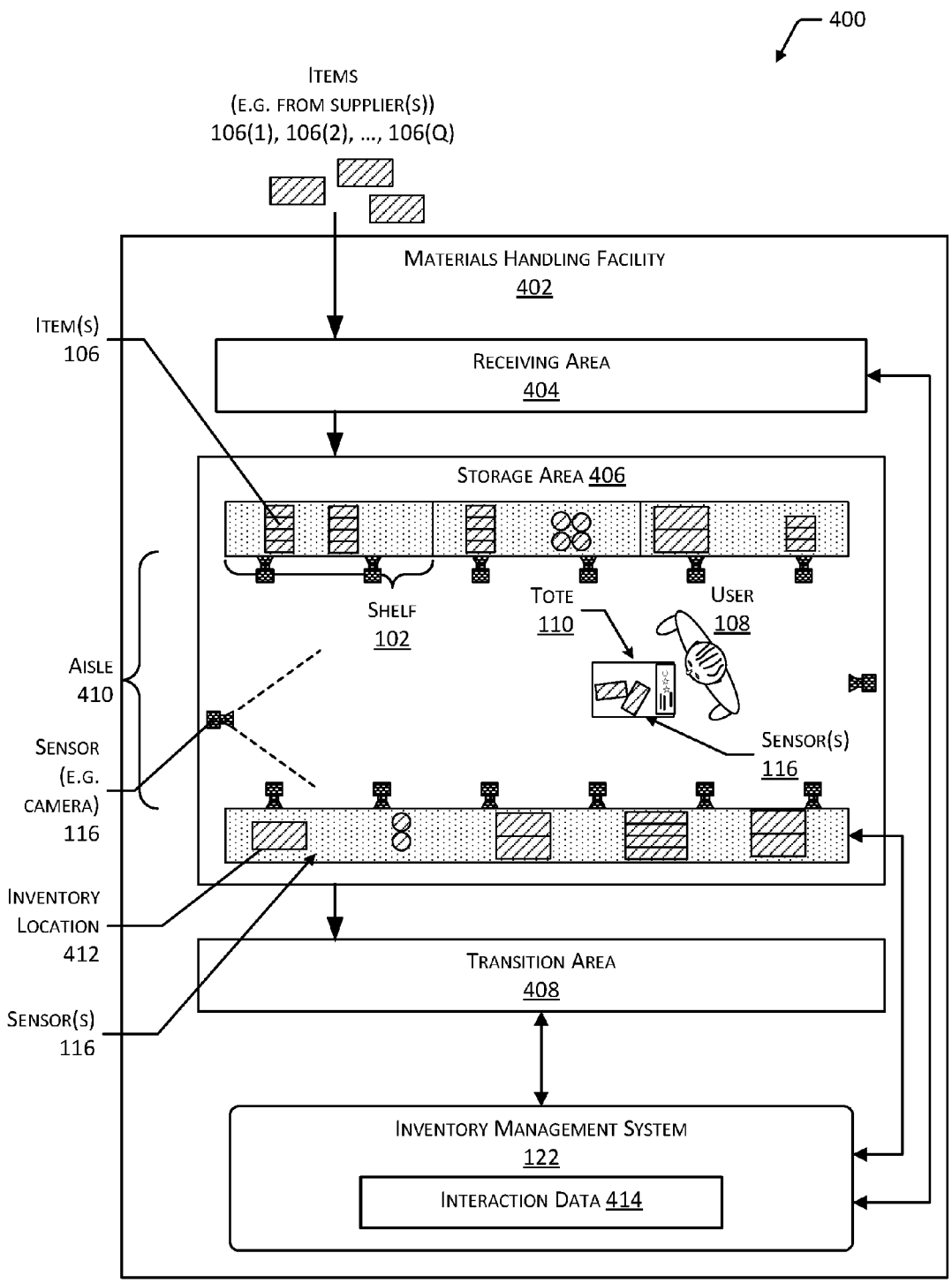
FIG. 4 is a block diagram illustrating a materials handling facility (facility) using the system, according to some implementations.

FIG. 4 is a block diagram 400 illustrating a materials handling facility (facility) 402 using the system 100, according to some implementations. A facility 402 comprises one or more physical structures or areas within which one or more items 106(1), 106(2), . . . , 106(Q) may be held. As used in this disclosure, letters in parenthesis such as "(Q)" indicate an integer value greater than or equal to zero. The items 106 may comprise physical goods, such as books, pharmaceuticals, repair parts, electronic gear, and so forth.

The facility 402 may include one or more areas designated for different functions with regard to inventory handling. In this illustration, the facility 402 includes a receiving area 404, a storage area 406, and a transition area 408.

The receiving area 404 may be configured to accept items 106, such as from suppliers, for intake into the facility 402. For example, the receiving area 404 may include a loading dock at which trucks or other freight conveyances unload the items 106. In some implementations, the items 106 may be processed, such as at the receiving area 404, to generate at least a portion of the item data 126. For example, an item 106 may be imaged or otherwise scanned to develop reference images or representations of the item 106 at the receiving area 404.

The storage area 406 is configured to store the items 106. The storage area 406 may be arranged in various physical configurations. In one implementation, the storage area 406 may include one or more aisles 410. The aisle 410 may be configured with, or defined by, inventory locations 412 on one or both sides of the aisle 410. The inventory locations 412 may include one or more of a shelf 102, a rack, a case, a cabinet, a bin, a floor location, or other suitable storage mechanisms for holding, supporting, or storing the items 106. For example, the inventory locations 412 may comprise shelves 102 with lanes 104 designated therein. The inventory locations 412 may be affixed to the floor or another portion of the structure of the facility 402. The inventory locations 412 may also be movable such that the arrangements of aisles 410 may be reconfigurable. In some implementations, the inventory locations 412 may be configured to move independently of an outside operator. For example, the inventory locations 412 may comprise a rack with a power source and a motor, operable by a computing device to allow the rack to move from one location within the facility 402 to another.

One or more users 108(1), 108(2), . . . , 108(U) and totes 110(1), 110(2), . . . , 110(T) or other material handling apparatus may move within the facility 402. For example, the user 108 may move about within the facility 402 to pick or place the items 106 in various inventory locations 412, placing them on the tote 110 for ease of transport. The tote 110 is configured to carry or otherwise transport one or more items 106. For example, the tote 110 may include a basket, cart, bag, bin, and so forth. In other implementations, other material handling apparatuses such as robots, forklifts, cranes, aerial drones, and so forth, may move about the facility 402 picking, placing, or otherwise moving the items 106. For example, a robot may pick an item 106 from a first inventory location 412(1) and move the item 106 to a second inventory location 412(2).

One or more sensors 116 may be configured to acquire information in the facility 402. The sensors 116 may include, but are not limited to, cameras 116(1), depth sensors 116(2), weight sensors 116(6), optical sensor arrays 116(13), proximity sensors 116(14), and so forth. The sensors 116 may be stationary or mobile, relative to the facility 402. For example, the inventory locations 412 may contain weight sensors 116(6) to acquire weight sensor data of items 106 stowed therein, cameras 116(1) to acquire images of picking or placement of items 106 on shelves 102, optical sensor arrays 116(13) to detect shadows of the user's 108 hands at the inventory locations 412, and so forth. In another example, the facility 402 may include cameras 116(1) to obtain images of the user 108 or other objects in the facility 402. The sensors 116 are discussed in more detail below with regard to FIG. 5.

While the storage area 406 is depicted as having one or more aisles 410, inventory locations 412 storing the items 106, sensors 116, and so forth, it is understood that the receiving area 404, the transition area 408, or other areas of the facility 402 may be similarly equipped. Furthermore, the arrangement of the various areas within the facility 402 is depicted functionally rather than schematically. For example, in some implementations, multiple different receiving areas 404, storage areas 406, and transition areas 408 may be interspersed rather than segregated in the facility 402.

The facility 402 may include, or be coupled to, an inventory management system 122. The inventory management system 122 is configured to interact with users 108 or devices such as sensors 116, robots, material handling equipment, computing devices, and so forth, in one or more of the receiving area 404, the storage area 406, or the transition area 408.

During operation of the facility 402, the sensors 116 may be configured to provide sensor data, or information based on the sensor data, to the inventory management system 122. The sensor data may include image data 120, non-image data, weight sensor data obtained from weight sensors 116(6), and so forth. The sensors 116 are described in more detail below with regard to FIG. 5.

The inventory management system 122 or other systems may use the sensor data to track the location of objects within the facility 402, movement of the objects, or provide other functionality. Objects may include, but are not limited to, items 106, users 108, totes 110, and so forth. For example, a series of images acquired by the camera 116(1) may indicate removal by the user 108 of an item 106 from a particular location on the inventory location 412 and placement of the item 106 on or at least partially within the tote 110.

The facility 402 may be configured to receive different kinds of items 106 from various suppliers and to store them until a customer orders or retrieves one or more of the items 106. A general flow of items 106 through the facility 402 is indicated by the arrows of FIG. 4. Specifically, as illustrated in this example, items 106 may be received from one or more suppliers, such as manufacturers, distributors, wholesalers, and so forth, at the receiving area 404. In various implementations, the items 106 may include merchandise, commodities, perishables, or any suitable type of item 106, depending on the nature of the enterprise that operates the facility 402.

Upon being received from a supplier at the receiving area 404, the items 106 may be prepared for storage in the storage area 406. For example, in some implementations, items 106 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 106. The items 106 may be stocked, managed, or dispensed in terms of countable units, individual units, or multiple units, such as packages, cartons, crates, pallets, or other suitable aggregations. Alternatively, some items 106, such as bulk products, commodities, and so forth, may be stored in continuous or arbitrarily divisible amounts that may not be inherently organized into countable units. Such items 106 may be managed in terms of a measurable quantity such as units of length, area, volume, weight, time, duration, or other dimensional properties characterized by units of measurement. Generally speaking, a quantity of an item 106 may refer to either a countable number of individual or aggregate units of an item 106 or a measurable amount of an item 106, as appropriate.

After arriving through the receiving area 404, items 106 may be stored within the storage area 406. In some implementations, like items 106 may be stored or displayed together in the inventory locations 412 such as in bins, on shelves 102, hanging from pegboards, and so forth. In this implementation, all items 106 of a given kind are stored in one inventory location 412. In other implementations, like items 106 may be stored in different inventory locations 412. For example, to optimize retrieval of certain items 106 having frequent turnover within a large physical facility 402, those items 106 may be stored in several different inventory locations 412 to reduce congestion that might occur at a single inventory location 412.

When a customer order specifying one or more items 106 is received, or as a user 108 progresses through the facility 402, the corresponding items 106 may be selected or "picked" from the inventory locations 412 containing those items 106. In various implementations, item picking may range from manual to completely automated picking. For example, in one implementation, a user 108 may have a list of items 106 they desire and may progress through the facility 402 picking items 106 from inventory locations 412 within the storage area 406 and placing those items 106 into a tote 110. In other implementations, employees of the facility 402 may pick items 106 using written or electronic pick lists derived from customer orders. These picked items 106 may be placed into the tote 110 as the employee progresses through the facility 402.

After items 106 have been picked, the items 106 may be processed at a transition area 408. The transition area 408 may be any designated area within the facility 402 where items 106 are transitioned from one location to another or from one entity to another. For example, the transition area 408 may be a packing station within the facility 402. When the item 106 arrives at the transition area 408, the item 106 may be transitioned from the storage area 406 to the packing station. Information about the transition may be maintained by the inventory management system 122.

In another example, if the items 106 are departing the facility 402, a list of the items 106 may be obtained and used by the inventory management system 122 to transition responsibility for, or custody of, the items 106 from the facility 402 to another entity. For example, a carrier may accept the items 106 for transport with that carrier accepting responsibility for the items 106 indicated in the list. In another example, a user 108 may purchase or rent the items 106 and remove the items 106 from the facility 402. During use of the facility 402, the user 108 may move about the facility 402 to perform various tasks, such as picking or placing the items 106 in the inventory locations 412.

To facilitate operation of the facility 402, the inventory management system 122 is configured to use the sensor data including the image data 120 and other information such as the item data 126, the physical layout data 212, the untidy score data 130, candidate item type set data 128, and so forth, to generate interaction data 414. For example, the confidence level associated with a determination that the user 108 has a particular item 106 in their tote 110 may be based on the untidy score data 130 associated with the inventory location 412 they are interacting with.

The interaction data 414 may provide information about an interaction, such as a pick of an item 106 from the inventory location 412, a place of an item 106 to the inventory location 412, a touch made to an item 106 at the inventory location 412, a gesture associated with an item 106 at the inventory location 412, and so forth. The interaction data 414 may include one or more of the type of interaction, interaction location identifier indicative of where from the inventory location 412 the interaction took place, item identifier, quantity change to the item 106, user identifier, and so forth. The interaction data 414 may then be used to further update the item data 126. For example, the quantity of items 106 on hand at a particular lane 104 on the shelf 102 may be changed based on an interaction that picks or places one or more items 106.

The inventory management system 122 may combine or otherwise utilize data from different sensors 116 of different types. For example, weight data obtained from weight sensors 116(6) at the inventory location 412 may be used instead of, or in conjunction with, the image data 120 to determine the interaction data 414.

By using the untidy score data 130, the inventory management system 122 may be able to more accurately operate the facility 102. For example, the interaction data 414 for an untidy lane 114 may be rated as having a lower confidence value or as being less certain than the interaction data 414 for a tidy lane 112.

Figure 5:
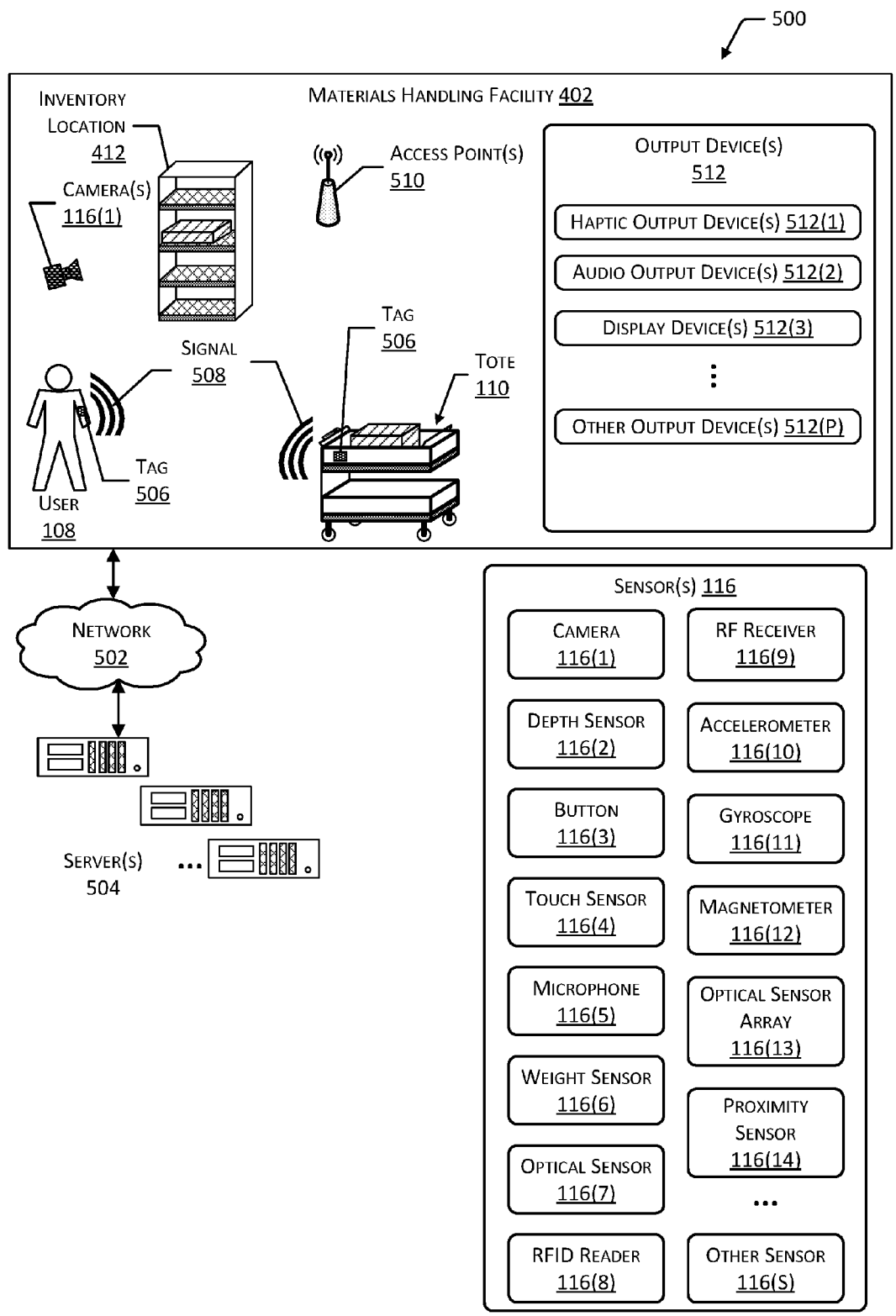
FIG. 5 is a block diagram illustrating additional details of the facility, according to some implementations.

FIG. 5 is a block diagram 500 illustrating additional details of the facility 402, according to some implementations. The facility 402 may be connected to one or more networks 502, which in turn connect to one or more servers 504. The network 502 may include private networks such as an institutional or personal intranet, public networks such as the Internet, or a combination thereof. The network 502 may utilize wired technologies (e.g., wires, fiber optic cables, and so forth), wireless technologies (e.g., radio frequency, infrared, acoustic, optical, and so forth), or other connection technologies. The network 502 is representative of any type of communication network, including one or more of data networks or voice networks. The network 502 may be implemented using wired infrastructure (e.g., copper cable, fiber optic cable, and so forth), a wireless infrastructure (e.g., cellular, microwave, satellite, and so forth), or other connection technologies.

The servers 504 may be configured to execute one or more modules or software applications associated with the inventory management system 122 or other systems. While the servers 504 are illustrated as being in a location outside of the facility 402, in other implementations, at least a portion of the servers 504 may be located at the facility 402. The servers 504 are discussed in more detail below with regard to FIG. 6.

The users 108, the totes 110, or other objects in the facility 402 may be equipped with one or more tags 506. The tags 506 may be configured to emit a signal 508. In one implementation, the tag 506 may be a radio frequency identification (RFID) tag 506 configured to emit a RF signal 508 upon activation by an external signal. For example, the external signal may comprise a radio frequency signal or a magnetic field configured to energize or activate the RFID tag 506. In another implementation, the tag 506 may comprise a transmitter and a power source configured to power the transmitter. For example, the tag 506 may comprise a Bluetooth Low Energy (BLE) transmitter and battery. In other implementations, the tag 506 may use other techniques to indicate presence of the tag 506. For example, an acoustic tag 506 may be configured to generate an ultrasonic signal 508, which is detected by corresponding acoustic receivers. In yet another implementation, the tag 506 may be configured to emit an optical signal 508.

The inventory management system 122 may be configured to use the tags 506 for one or more of identification of the object, determining a location of the object, and so forth. For example, the users 108 may wear tags 506, the totes 110 may have tags 506 affixed, and so forth, which may be read and, based at least in part on signal strength, used to determine identity and location.

Generally, the inventory management system 122 or other systems associated with the facility 402 may include any number and combination of input components, output components, and servers 504.

The one or more sensors 116 may be arranged at one or more locations within the facility 402. For example, the sensors 116 may be mounted on or within a floor, wall, at a ceiling, at an inventory location 412, on a tote 110, may be carried or worn by a user 108, and so forth.

The sensors 116 may include one or more cameras 116(1) or other imaging sensors. The one or more cameras 116(1) may include imaging sensors configured to acquire images of a scene. The cameras 116(1) are configured to detect light in one or more wavelengths including, but not limited to, terahertz, infrared, visible, ultraviolet, and so forth. The cameras 116(1) may comprise charge coupled devices (CCD), complementary metal oxide semiconductor (CMOS) devices, microbolometers, and so forth. The inventory management system 122 may use image data 120 acquired by the cameras 116(1) during operation of the facility 402. For example, the inventory management system 122 may identify items 106, users 108, totes 110, and so forth, based at least in part on their appearance within the image data 120 acquired by the cameras 116(1). The cameras 116(1) may be mounted in various locations within the facility 402. For example, cameras 116(1) may be mounted overhead, on inventory locations 412, may be worn or carried by users 108, may be affixed to totes 110, and so forth.

One or more depth sensors 116(2) may also be included in the sensors 116. The depth sensors 116(2) are configured to acquire spatial or three-dimensional (3D) data, such as depth information, about objects within a FOV 118. The depth sensors 116(2) may include range cameras, lidar systems, sonar systems, radar systems, structured light systems, stereo vision systems, optical interferometry systems, and so forth. The inventory management system 122 may use the 3D data acquired by the depth sensors 116(2) to identify objects, determine a location of an object in 3D real space, and so forth. One or more buttons 116(3) may be configured to accept input from the user 108. The buttons 116(3) may comprise mechanical, capacitive, optical, or other mechanisms. For example, the buttons 116(3) may comprise mechanical switches configured to accept an applied force from a touch of the user 108 to generate an input signal. The inventory management system 122 may use data from the buttons 116(3) to receive information from the user 108. For example, the tote 110 may be configured with a button 116(3) to accept input from the user 108 and send information indicative of the input to the inventory management system 122.

The sensors 116 may include one or more touch sensors 116(4). The touch sensors 116(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 122 may use data from the touch sensors 116(4) to receive information from the user 108. For example, the touch sensor 116(4) may be integrated with the tote 110 to provide a touchscreen with which the user 108 may select from a menu one or more particular items 106 for picking, enter a manual count of items 106 at an inventory location 412, and so forth.

One or more microphones 116(5) may be configured to acquire information indicative of sound present in the environment. In some implementations, arrays of microphones 116(5) may be used. These arrays may implement beamforming techniques to provide for directionality of gain. The inventory management system 122 may use the one or more microphones 116(5) to acquire information from acoustic tags 506, accept voice input from the users 108, determine ambient noise level, and so forth.

One or more weight sensors 116(6) are configured to measure the weight of a load, such as the item 106, the tote 110, or other objects. The weight sensors 116(6) may be configured to measure the weight of the load at one or more of the inventory locations 412, the tote 110, on the floor of the facility 402, and so forth. For example, the shelf 102 may include a plurality of lanes 104 or platforms, with one or more weight sensors 116(6) beneath each one to provide weight sensor data about an individual lane 104 or platform. The weight sensors 116(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 116(6) may operate as transducers that generate one or more signals based on an applied force, such as that of the load due to gravity. For example, the weight sensor 116(6) may comprise a load cell having a strain gauge and a structural member that deforms slightly when weight is applied. By measuring a change in the electrical characteristic of the strain gauge, such as capacitance or resistance, the weight may be determined. In another example, the weight sensor 116(6) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 122 may use the data acquired by the weight sensors 116(6) to identify an object, determine a change in the quantity of objects, determine a location of an object, maintain shipping records, and so forth.

The sensors 116 may include one or more optical sensors 116(7). The optical sensors 116(7) may be configured to provide data indicative of one or more of color or intensity of light impinging thereupon. For example, the optical sensor 116(7) may comprise a photodiode and associated circuitry configured to generate a signal or data indicative of an incident flux of photons. As described below, the optical sensor array 116(13) may comprise a plurality of the optical sensors 116(7). For example, the optical sensor array 116(13) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 116(7) may be used. The optical sensors 116(7) may be sensitive to one or more of infrared light, visible light, or ultraviolet light. For example, the optical sensors 116(7) may be sensitive to infrared light, and infrared light sources such as LEDs may provide illumination.

The optical sensors 116(7) may include photodiodes, photoresistors, photovoltaic cells, quantum dot photoconductors, bolometers, pyroelectric infrared detectors, and so forth. For example, the optical sensor 116(7) may use germanium photodiodes to detect infrared light.

One or more radio frequency identification (RFID) readers 116(8), near field communication (NFC) systems, and so forth, may be included as sensors 116. For example, the RFID readers 116(8) may be configured to read the RF tags 506. Information acquired by the RFID reader 116(8) may be used by the inventory management system 122 to identify an object associated with the RF tag 506 such as the item 106, the user 108, the tote 110, and so forth. For example, based on information from the RFID readers 116(8) detecting the RF tag 506 at different times and RFID readers 116(8) having different locations in the facility 402, a velocity of the RF tag 506 may be determined.

One or more RF receivers 116(9) may also be included as sensors 116. In some implementations, the RF receivers 116(9) may be part of transceiver assemblies. The RF receivers 116(9) may be configured to acquire RF signals 508 associated with Wi-Fi, Bluetooth, ZigBee, 5G, 4G, 3G, LTE, or other wireless data transmission technologies. The RF receivers 116(9) may provide information associated with data transmitted via radio frequencies, signal strength of RF signals 508, and so forth. For example, information from the RF receivers 116(9) may be used by the inventory management system 122 to determine a location of an RF source, such as a communication interface onboard the tote 110.

The sensors 116 may include one or more accelerometers 116(10), which may be worn or carried by the user 108, mounted to the tote 110, and so forth. The accelerometers 116(10) may provide information such as the direction and magnitude of an imposed acceleration. Data such as rate of acceleration, determination of changes in direction, speed, and so forth, may be determined using the accelerometers 116(10).

A gyroscope 116(11) may provide information indicative of rotation of an object affixed thereto. For example, the tote 110 or other objects may be equipped with a gyroscope 116(11) to provide data indicative of a change in orientation of the object.

A magnetometer 116(12) may be used to determine an orientation by measuring ambient magnetic fields, such as the terrestrial magnetic field. The magnetometer 116(12) may be worn or carried by the user 108, mounted to the tote 110, and so forth. For example, the magnetometer 116(12) mounted to the tote 110 may act as a compass and provide information indicative of which direction the tote 110 is oriented.

An optical sensor array 116(13) may comprise one or optical sensors 116(7). The optical sensors 116(7) may be arranged in a regular, repeating, or periodic two-dimensional arrangement such as a grid. The optical sensor array 116(13) may generate image data 120. For example, the optical sensor array 116(13) may be arranged within or below an inventory location 412 and obtain information about shadows of items 106, hand of the user 108, and so forth.

The sensors 116 may include proximity sensors 116(14) used to determine presence of an object, such as the user 108, the tote 110, and so forth. The proximity sensors 116(14) may use optical, electrical, ultrasonic, electromagnetic, or other techniques to determine a presence of an object. In some implementations, the proximity sensors 116(14) may use an optical emitter and an optical detector to determine proximity. For example, an optical emitter may emit light, a portion of which may then be reflected by the object back to the optical detector to provide an indication that the object is proximate to the proximity sensor 116(14). In other implementations, the proximity sensors 116(14) may comprise a capacitive proximity sensor 116(14) configured to provide an electrical field and determine a change in electrical capacitance due to presence or absence of an object within the electrical field.

The proximity sensors 116(14) may be configured to provide sensor data indicative of one or more of a presence or absence of an object, a distance to the object, or characteristics of the object. An optical proximity sensor 116(14) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 116 such as a camera 116(1). Based on an apparent distance between the features of the structured light pattern, the distance to the object may be calculated. Other techniques may also be used to determine distance to the object. In another example, the color of the reflected light may be used to characterize the object, such as skin, clothing, tote 110, and so forth.

The sensors 116 may include other sensors 116(S) as well. For example, the other sensors 116(S) may include light curtains, ultrasonic rangefinders, thermometers, barometric sensors, hygrometers, and so forth. For example, the inventory management system 122 may use information acquired from thermometers and hygrometers in the facility 402 to direct the user 108 to check on delicate items 106 stored in a particular inventory location 412, which is overheating, too dry, too damp, and so forth.

In one implementation, a light curtain may utilize a linear array of light emitters and a corresponding linear array of light detectors. For example, the light emitters may comprise a line of infrared light emitting diodes (LEDs) or vertical cavity surface emitting lasers (VCSELs) that are arranged above a top shelf 102 in front of the inventory location 412, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 108 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 108 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand of a user 108 may be used to trigger acquisition or selection of image data 120 for processing by the analysis module 124 to generate the untidy score data 130.

The other sensors 116(5) may also include an instrumented auto-facing unit (AFU). The instrumented AFU may comprise a position sensor configured to provide data indicative of displacement of a pusher. As an item 106 is removed from the AFU, the pusher moves, such as under the influence of a spring, and pushes the remaining items 106 in the AFU to the front of the inventory location 412. By using data from the position sensor, and given item data 126 such as a depth of an individual item 106, a count may be determined, based on a change in position data. For example, if each item 106 is 1 inch deep, and the position data indicates a change of 5 inches, the quantity held by the AFU may have changed by 5 items 106. This count information may be used to confirm or provide a cross check for a count obtained by other means, such as analysis of the image data 120.

In some implementations, the camera 116(1) or other sensors 116(S) may include hardware processors, memory, and other elements configured to perform various functions. For example, the cameras 116(1) may be configured to generate image data 120, send the image data 120 to another device such as the server 504, and so forth.

The facility 402 may include one or more access points 510 configured to establish one or more wireless networks. The access points 510 may use Wi-Fi, NFC, Bluetooth, or other technologies to establish wireless communications between a device and the network 502. The wireless networks allow the devices to communicate with one or more of the sensors 116, the inventory management system 122, the optical sensor arrays 116(13), the tag 506, a communication device of the tote 110, or other devices.

Output devices 512 may also be provided in the facility 402. The output devices 512 are configured to generate signals, which may be perceived by the user 108 or detected by the sensors 116. In some implementations, the output devices 512 may be used to provide illumination of the optical sensor array 116(13).

Haptic output devices 512(1) are configured to provide a signal that results in a tactile sensation to the user 108. The haptic output devices 512(1) may use one or more mechanisms such as electrical stimulation or mechanical displacement to provide the signal. For example, the haptic output devices 512(1) may be configured to generate a modulated electrical signal, which produces an apparent tactile sensation in one or more fingers of the user 108. In another example, the haptic output devices 512(1) may comprise piezoelectric or rotary motor devices configured to provide a vibration, which may be felt by the user 108.

One or more audio output devices 512(2) may be configured to provide acoustic output. The acoustic output includes one or more of infrasonic sound, audible sound, or ultrasonic sound. The audio output devices 512(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 512(3) may be configured to provide output, which may be seen by the user 108 or detected by a light-sensitive sensor such as a camera 116(1) or an optical sensor 116(7). In some implementations, the display devices 512(3) may be configured to produce output in one or more of infrared, visible, or ultraviolet light. The output may be monochrome or in color. The display devices 512(3) may be one or more of emissive, reflective, microelectromechanical, and so forth. An emissive display device 512(3), such as using LEDs, is configured to emit light during operation. In comparison, a reflective display device 512(3), such as using an electrophoretic element, relies on ambient light to present an image. Backlights or front lights may be used to illuminate non-emissive display devices 512(3) to provide visibility of the output in conditions where the ambient light levels are low.

The display devices 512(3) may be located at various points within the facility 402. For example, the addressable displays may be located on inventory locations 412, totes 110, on the floor of the facility 402, and so forth.

Other output devices 512(P) may also be present. For example, the other output devices 512(P) may include scent/odor dispensers, document printers, 3D printers or fabrication equipment, and so forth.

Figure 6:
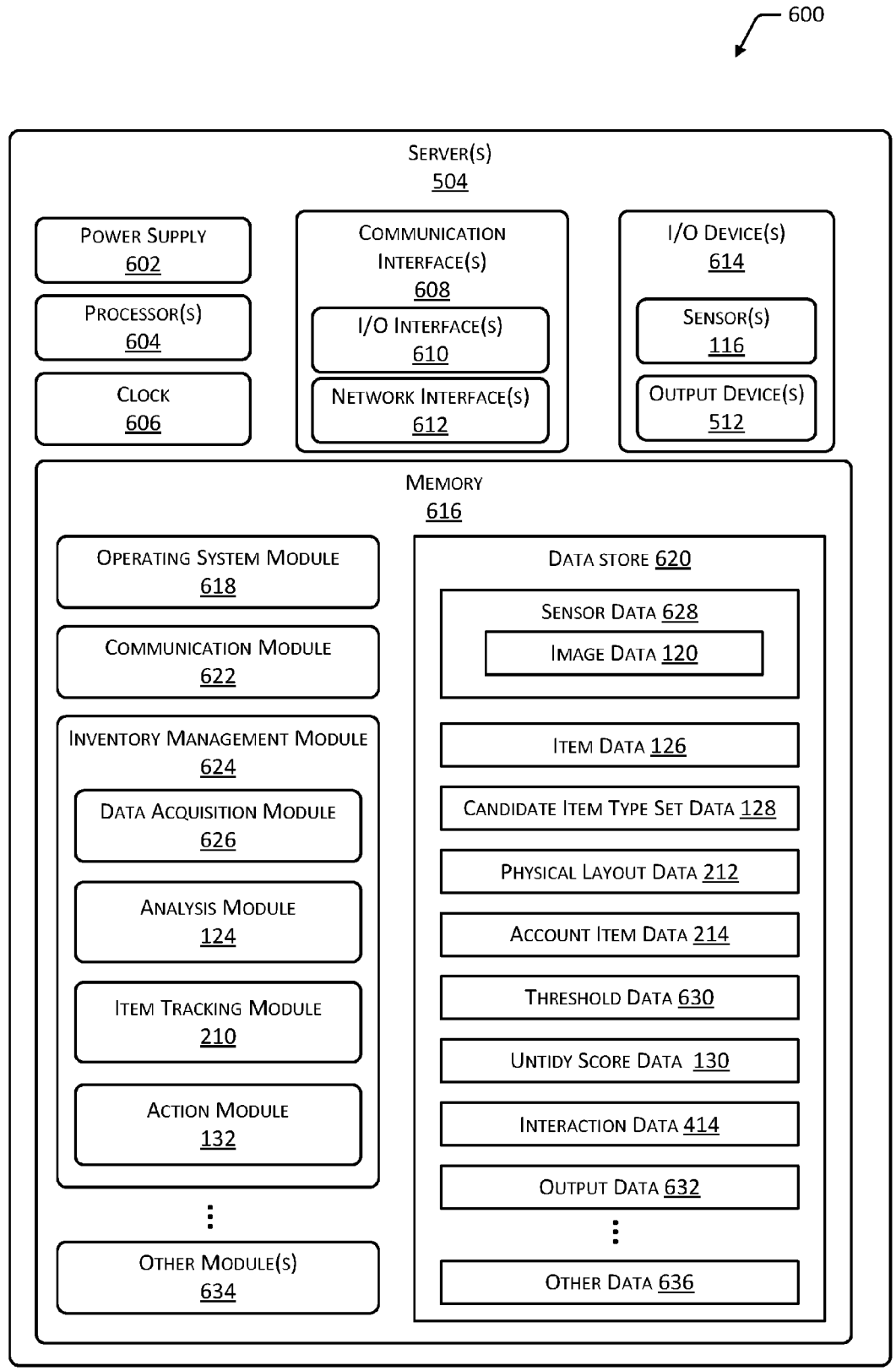
FIG. 6 is a block diagram of a server to support operation of the facility, according to some implementations.

FIG. 6 illustrates a block diagram 600 of a server 504 configured to support operation of the facility 402, according to some implementations. The server 504 may be physically present at the facility 402, may be accessible by the network 502, or a combination of both. The server 504 does not require end-user knowledge of the physical location and configuration of the system that delivers the services. Common expressions associated with the server 504 may include "on-demand computing", "software as a service (SaaS)", "platform computing", "network-accessible platform", "cloud services", "data centers", and so forth. Services provided by the server 504 may be distributed across one or more physical or virtual devices.

One or more power supplies 602 may be configured to provide electrical power suitable for operating the components in the server 504. The one or more power supplies 602 may comprise batteries, capacitors, fuel cells, photovoltaic cells, wireless power receivers, conductive couplings suitable for attachment to an external power source such as provided by an electric utility, and so forth. The server 504 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The server 504 may include one or more communication interfaces 608 such as input/output (I/O) interfaces 610, network interfaces 612, and so forth. The communication interfaces 608 enable the server 504, or components thereof, to communicate with other devices or components. The communication interfaces 608 may include one or more I/O interfaces 610. The I/O interfaces 610 may comprise Inter-Integrated Circuit (12C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 116, keyboard, mouse, scanner, and so forth. The I/O devices 614 may also include output devices 512 such as one or more of a display device 512(3), printer, audio speakers, and so forth. In some embodiments, the I/O devices 614 may be physically incorporated with the server 504 or may be externally placed.

The network interfaces 612 may be configured to provide communications between the server 504 and other devices, such as the totes 110, routers, access points 510, and so forth. The network interfaces 612 may include devices configured to couple to personal area networks (PANs), local area networks (LANs), wireless local area networks (WLANS), wide area networks (WANs), and so forth. For example, the network interfaces 612 may include devices compatible with Ethernet, Wi-Fi, Bluetooth, ZigBee, and so forth.

The server 504 may also include one or more busses or other internal communications hardware or software that allow for the transfer of data between the various modules and components of the server 504.

As shown in FIG. 6, the server 504 includes one or more memories 616. The memory 616 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 616 provides storage of computer-readable instructions, data structures, program modules, and other data for the operation of the server 504. A few example functional modules are shown stored in the memory 616, although the same functionality may alternatively be implemented in hardware, firmware, or as a system on a chip (SoC).

The memory 616 may include at least one operating system (OS) module 618. The OS module 618 is configured to manage hardware resource devices such as the I/O interfaces 610, the I/O devices 614, the communication interfaces 608, and provide various services to applications or modules executing on the processors 604. The OS module 618 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 616 may be a data store 620 and one or more of the following modules. These modules may be executed as foreground applications, background tasks, daemons, and so forth. The data store 620 may use a flat file, database, linked list, tree, executable code, script, or other data structure to store information. In some implementations, the data store 620 or a portion of the data store 620 may be distributed across one or more other devices including the servers 504, network attached storage devices, and so forth.

A communication module 622 may be configured to establish communications with one or more of the totes 110, sensors 116, display devices 512(3), other servers 504, or other devices. The communications may be authenticated, encrypted, and so forth.

The memory 616 may store an inventory management module 624. The inventory management module 624 is configured to provide the inventory functions as described herein with regard to the inventory management system 122. For example, the inventory management module 624 may track items 106 between different inventory locations 412, to and from the totes 110, and so forth. The inventory management module 624 may access sensor data 628, threshold data 630, and so forth. The inventory management module 624 may generate output data 632. The sensor data 628 comprises information acquired by one or more the sensors 116, such as the image data 120. The threshold data 630 may comprise one or more thresholds. For example, the threshold value may specify an untidy score value above which the inventory location 412 is determined to be untidy. In some implementations, the threshold data 630 may be determined from testing. For example, data image data 120 associated with known tidy lanes 112 and known untidy lanes 114 may be processed to determine untidy score data 130. This untidy score data 130 from known levels of tidiness may be used to determine threshold values. Once an inventory location 412 is determined to be untidy, some mitigating action may be taken. For example, the output data 632 may comprise a dispatch order for an attendant to remedy an untidy lane 114.

The inventory management module 624 may include one or more of a data acquisition module 626, the analysis module 124, the item tracking module 210, the action module 132, and so forth. The data acquisition module 626 may be configured to acquire and access information associated with operation of the facility 402. For example, the data acquisition module 626 may be configured to acquire sensor data 628, such as the image data 120, from one or more of the sensors 116.

As described above, the analysis module 124 may be configured to generate the untidy score data 130. The item tracking module 210 may be configured to generate the account item data 214.

Processing sensor data 628, such as the image data 120, may be performed by a module implementing, at least in part, one or more of the following tools or techniques. In one implementation, processing of the image data 120 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 628. In still another implementation, functions such as those in the Machine Vision Toolbox for Matlab (MVTB) available using MATLAB as developed by MathWorks, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 628 or other data. For example, the ANN may be a trained using a supervised learning algorithm such that object identifiers are associated with images of particular objects within training images provided to the ANN. Once trained, the ANN may be provided with the sensor data 628 such as the cropped image data 204 and the item data 126 to allow for a determination of similarity between two or more images.

In some implementations, the item tracking module 210 may process image data 120 using one or more machine vision counting techniques to determine a count of the items 106. For example, machine vision counting techniques may be configured to recognize a top or front portion of the items 106 in the image data 120. This determination may be based on item data 126, such as previously acquired images of a sampled item 106. Each of the tops of the type of item 106 appearing in the image data 120 may be identified and a count made. A change in count may be determined based on image data 120 obtained at a first time and a second time, respectively.

In one implementation, the item tracking module 210 may use one or more algorithms to determine the items 106 in the FOV 118. For example, a histogram of gradients (HOG) algorithm may be used to extract the features of the items 106. A state vector machine (SVM) may then be used to classify the extracted features and determine which of the extracted features correspond to items 106. Output data 632 may be generated that is the resulting count of the items 106 determined by the SVM to be in the image data 120.

Other modules 634 may also be present in the memory 616 as well as other data 636 in the data store 620. For example, the other modules 634 may include an accounting module while the other data 636 may include billing data. The accounting module may be configured to assess charges to accounts associated with particular users 108 or other entities, while the billing data may include information such as payment account numbers.

Illustrative Processes

Figure 7:
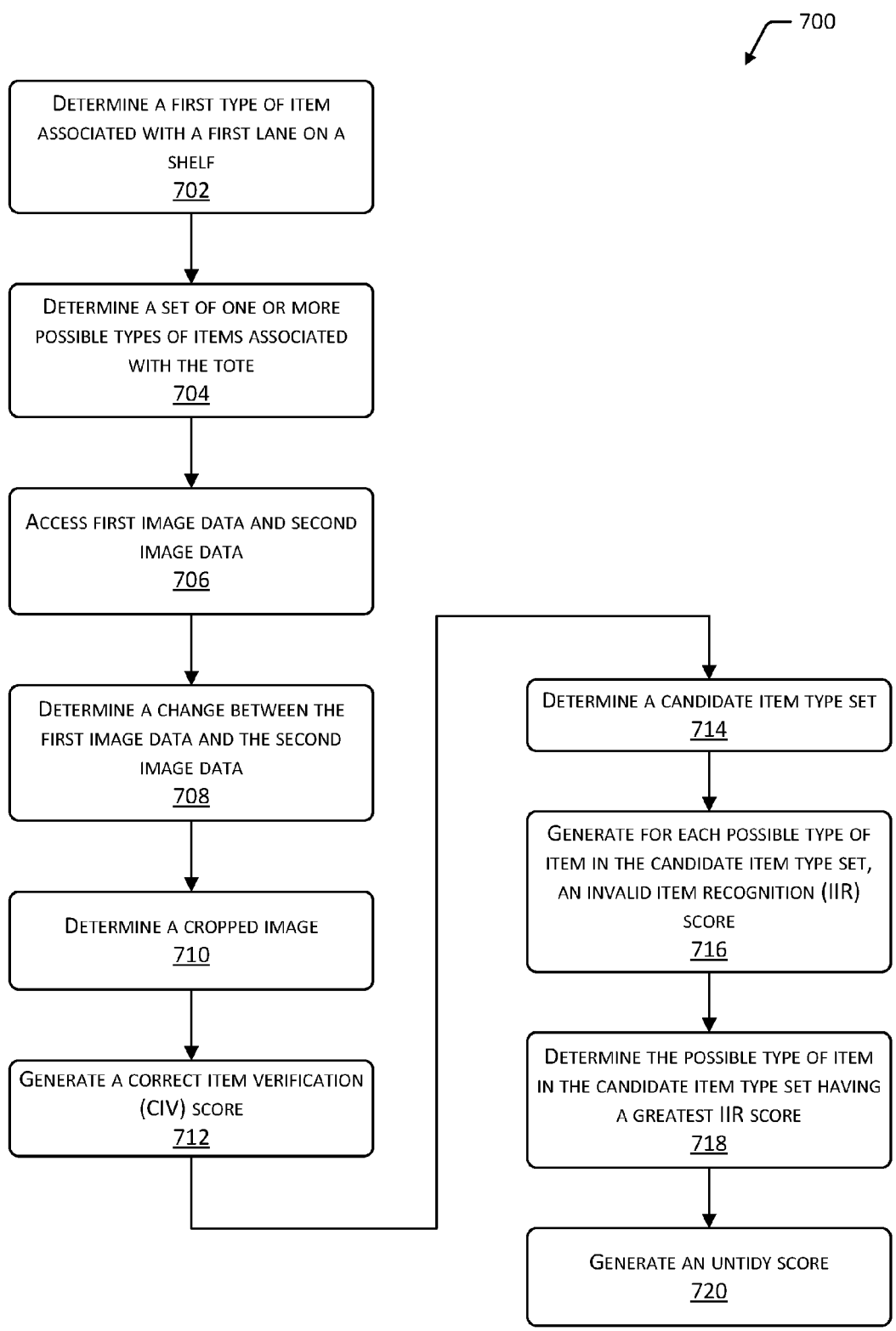
FIG. 7 depicts a flow diagram of a process for generating an untidy score indicative of tidiness at an inventory location, according to some implementations.

FIG. 7 depicts a flow diagram 700 of a process for an untidy score indicative of tidiness at an inventory location 412, according to some implementations. The process may be implemented at least in part by the inventory management module 624. In different implementations, one or more of the blocks described below may be omitted, the sequence of the process using these blocks may vary from that depicted, and so forth.

Block 702 determines a first type of item 106 associated with a first lane 104 on a shelf 102 or other inventory location 412. For example, the item data 126 may be accessed to look up the type of item 106 associated with a particular inventory location 412.

Block 704 determines a set of one or more possible types of items 106 associated with a particular tote 110, a particular user 108, and so forth. For example, the account item data 214 for a particular user account may be accessed.

Block 706 accesses first image data 120 obtained by the camera 116(1) at a first time and second image data 120 obtained by the camera 116(1) at a second time. In some implementations, the first time may be prior to occurrence of an event and the second time may be after occurrence of an event. An event may be determined based on a change at the inventory location 412, such as a change in images, weight, proximity detected by a proximity sensor 116(14), and so forth.

Block 708 determines a change between the first image data 120 and the second image data 120. For example, the first image data 120 and the second image data 120 may be compared with one another to determine a change between the two. If the change exceeds a threshold value, the change may be determined as occurring.

Block 710 determines cropped image data 204. For example, the cropped image data 204 may comprise a portion of the second image that is representative of the change.

Block 712 generates a correct item verification (CIV) score indicative of a similarity between the cropped image data 204 and the first type of item 106 associated with the first inventory location 412, such as a lane 104.

Block 714 determines candidate item type set data 128. The candidate item type set data 128 may include a set of one or more types of items 106 associated with the tote 110, the user 108, and so forth, but which excludes the first type of item 106 associated with the first inventory location 412.

Block 716 generates for each possible type of item 106 in the candidate item type set data 128, an invalid item recognition (IIR) score that is indicative of a similarity between the cropped image data 204 and the possible type of item 106.

Block 718 determines the possible type of item 106 in the candidate item type set data 128 having a greatest IIR score 302, wherein the greatest IIR score 302 is indicative of greatest similarity.

Block 720 generates untidy score data 130 based on the CIV score data 208 and the greatest IIR score 302 in the IIR score data 220. The untidy score data 130 is indicative of a likelihood an item 106 was incorrectly placed in the first inventory location 412.

Figure 8:
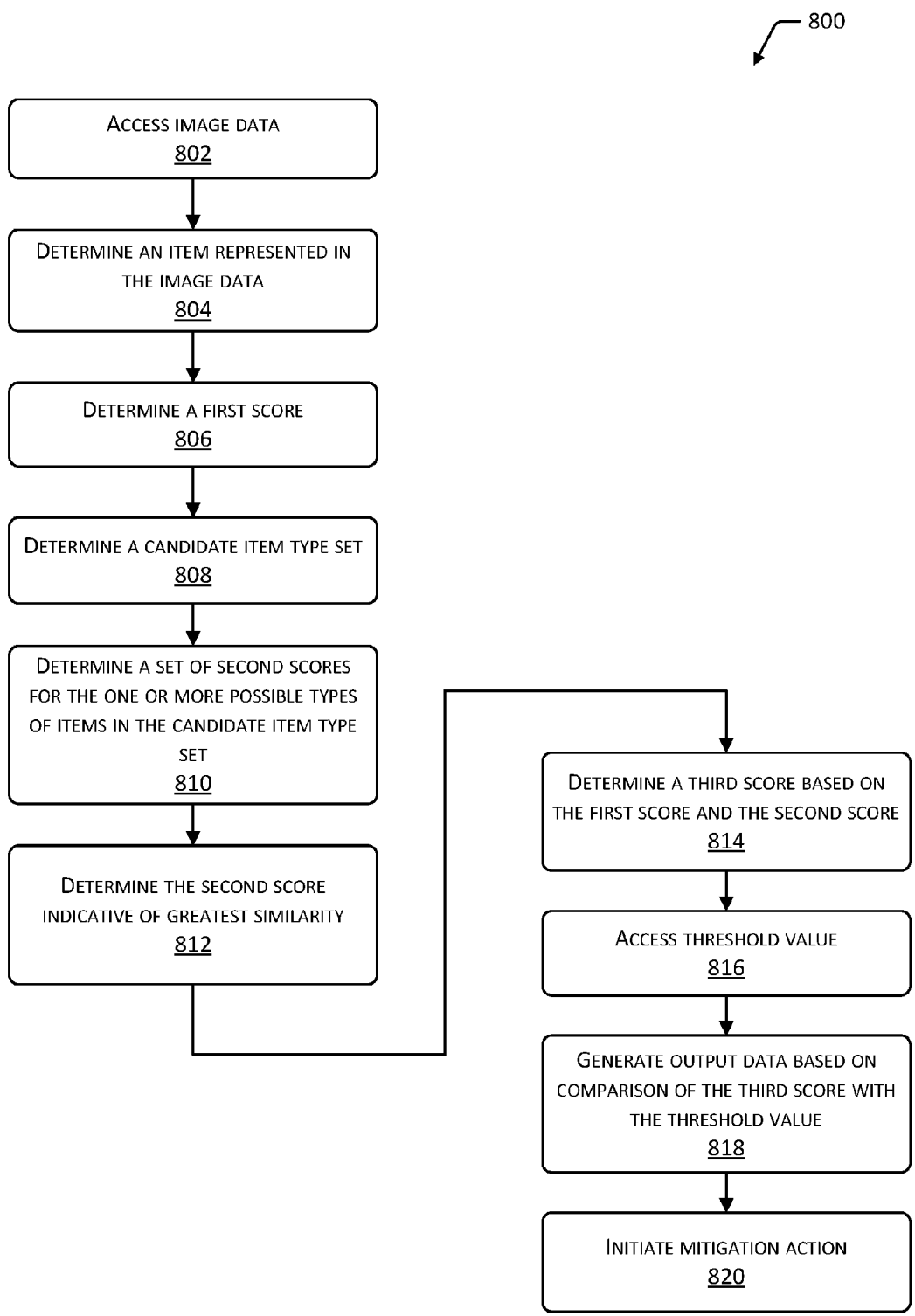
FIG. 8 depicts a flow diagram of a process for generating data indicative of tidiness at an inventory location, according to some implementations.

FIG. 8 depicts a flow diagram 800 of a process for generating data indicative of tidiness at an inventory location 412, according to some implementations. The process may be implemented at least in part by the inventory management module 624. In different implementations, one or more of the blocks described below may be omitted, the sequence of the process using these blocks may vary from that depicted, and so forth.

Block 802 accesses sensor data 628 of an inventory location 412 obtained from a sensor 116. For example, image data 120 obtained by a camera 116(1) may be accessed.

In some implementations, a change in weight indicative of placement of the item 106 at the inventory location 412 may be determined. The determination may be based on weight data acquired from the weight sensor 116(6). The change may occur at a first time. The image data 120 may comprise a first image acquired at or prior to the first time and a second image acquired after the first time. For example, the weight change may be indicative of an interaction, such as the user 108 placing an item 106 on the shelf 102.

Block 804 determines an item 106 represented in the sensor data 628. For example, the image data 120 may be processed to determine a portion of the image data 120 that corresponds to a front of a lane 104.

In one implementation, the image data 120 may comprise a first image acquired at a first time and a second image acquired at a second time. The first image and the second image may be analyzed to determine a change between the first image data 120 and the second image data 120. An area of the second image data 120 associated with the change may be determined. For example, the area may be expressed as a bounding box around the portion of the second image that exhibits the change. The item data 126 associated with the type of item 106 designated as stowed at the portion of the inventory location 412 associated with the area may be accessed. For example, the item data 126 may be indicative of a width and depth of the type of item 106. The area of the second image data 120 may be processed using a classifier to determine a front of an item 106 at the inventory location 412. Based on a position of the front of the item 106 and the width and depth of the type of item 106, a ROI within the area may be determined. The ROI may be designated as representative of the item 106 in the image data 120.

Block 806 determines a first score indicative of a similarity between the item 106 represented in the sensor data 628 and a type of item 106 associated with at least a portion of the inventory location 412. For example, the CIV score data 208 may be determined based on the image data 120.

The determination of the similarity between the item 106 represented in the image data 120 and the type of item 106 associated with at least a portion of the inventory location 412 may be made free from identification of the item 106 represented in the image data 120. For example, the similarity may be determined but the item 106 may remain unidentified.

Block 808 determines candidate item type set data 128 of one or more types of items 106 that are associated with a particular entity, such as in the custody of a user 108. The entity may comprise a user account associated with a user 108, a tote 110, and so forth. The candidate item type set data 128 excludes the type of item 106 associated with the at least a portion of the inventory location 412. For example, one or more types of items 106 that are associated with a particular user account may comprise those types of items 106 of which at least one item 106 is in custody of a user 108 represented by the user account. Continuing the example, the user 108 may be holding an item 106.

In some implementations, the item tracking module 210 may generate account item data 214 that is then used to generate the candidate item type set data 128. The candidate item type set data 128 may be based on a determination of a tote 110 associated with the particular user account. Once the tote 110 has been determined, a weight of the tote 110 may be determined. Based on the weight, at least one of the one or more types of items 106 within the tote 110 may be determined. For example, as a user 108 added an item 106 to the tote 110, the change in weight may be used to determine the item 106 placed into the tote 110 and update the account item data 214.

Block 810 determines a set of second scores, each second score indicative of a similarity between the item 106 represented in the sensor data 628 and one of the one or more possible types of items 106 in the candidate item type set data 128. For example, the IIR score module 218 may generate the IIR score data 220 for the types of items 106 in the candidate item type set data 128.

Block 812 determines the second score indicative of greatest similarity between an associated type of item 106 and the item 106 represented in the sensor data 628. For example, the greatest IIR score 302 may be determined by selecting the IIR score data 220 that has the greatest value.

In some implementations, the determination of the first score and the determination of the set of second scores may occur contemporaneously with one another. For example, the CIV score module 206 and the IIR score module 218 may operate in parallel for at least some time.

Block 814 determines a third score based on the first score and the second score indicative of greatest similarity. The third score is indicative of a likelihood the item 106 is correctly placed at the at least a portion of the inventory location 412. For example, the third score may comprise untidy score data 130 that is based on the CIV score data 208 and the greatest IIR score 302 in the IIR score data 220.

Block 816 accesses threshold data 630. For example, the threshold data 630 may specify a threshold value that is used to designate if the untidy score data 130 is indicative of a tidy lane 112 or an untidy lane 114.

Block 818 generates output data 632 based on a comparison of the third score with the threshold value. In some implementations, the output data 632 may comprise the untidy score data 130. The threshold value may be accessed, the third score may be compared to the threshold value, and based on the comparison, a determination may be made that the item 106 was incorrectly placed at the at least a portion of the inventory location 412.

Block 820 initiates a mitigation action. A first mitigation action may include reducing the confidence level of the account item data 214 generated by the item tracking module 210 responsive to the user's 108 interaction with an untidy lane 114. For example, based at least in part on the determination the third score is below the threshold value, information associated with the subsequent event may be designated as a having a low confidence value. In some implementations, the designation as a low confidence value may be made retroactively. For example, the determination of the untidy score data 130 may be made later than a determination of a quantity of items 106 picked from the shelf 102. As a result of the designation of the low confidence value, the previously made determination of the quantity of items 106 may be retroactively designated as having a low confidence value.

In some implementations, the determination of the untidy score data 130 being below the threshold value may trigger other actions, such as reprocessing the sensor data 628. For example, the reprocessing the sensor data 628 may comprise processing the image data 120 using one or more of different recognition modules, receiving input from a human operator, and so forth.

A second mitigation action may include dispatching an attendant to clean up the untidy lane 114. Once the attendant, or another agent such a robot, has cleaned up the lane 104, the inventory management system 122 may be notified. For example, the attendant may utilize a reportable computing device to send data to the inventory management system 122 that the inventory location 412 is now tidy. As a result, subsequent information associated with the subsequent events may be designated as having a high confidence value.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a shelf to hold a first type of item in a first lane;
    a camera having a field of view (FOV) that includes at least a portion of the first lane;
    a tote to hold one or more items; and
    a computing device comprising:
        a memory, storing computer-executable instructions; and
        a hardware processor to execute the computer-executable instructions to:
            determine the first type of item associated with the first lane;
            determine a set of one or more possible types of items associated with the tote;
            access first image data obtained by the camera at a first time and second image data obtained by the camera at a second time;
            determine data indicative of a difference between the first image data and the second image data;
            determine a portion of the second image data that is representative of the difference;
            generate a correct item verification (CIV) score indicative of a similarity between at least a portion of an item represented in the portion of the second image data and the first type of item associated with the first lane;
            determine a candidate item type set including the set of one or more possible types of items associated with the tote but excluding the first type of item associated with the first lane;

generate for each possible type of item in the candidate item type set, a corresponding invalid item recognition (IIR) score indicative of a similarity between the portion of the second image data and the possible type of item;

determine the possible type of item in the candidate item type set having a greatest IIR score, wherein the greatest IIR score is indicative of greatest similarity; and generate an untidy score based on the CIV score and the greatest IIR score, wherein the untidy score is indicative of a likelihood an item was incorrectly placed in the first lane.

2. The system of claim 1, the computer-executable instructions to generate the untidy score further comprising computer-executable instructions to implement equation:

$$\text{untidy score} = \frac{e^{ax}}{1 + e^{ax}}$$

with x ≜ greatest IIR score−CIV score and a is a parameter chosen to maximize distinction between correct placement at the first lane and incorrect placement at the first lane.

3. The system of claim 1, the computer-executable instructions to determine the first type of item associated with the first lane further comprising computer-executable instructions to:

retrieve information indicative of the first type of item as stored at the first lane;

the computer-executable instructions to determine the set of one or more possible types of items associated with the tote further comprising computer-executable instructions to:

retrieve information indicative of the set of one or more possible types of items associated with the tote; and the computer-executable instructions to determine the data indicative of the difference between the first image data and the second image data further comprising computer-executable instructions to:

subtract, for each respective pixel, a value represented by the first image data from the second image data.

4. The system of claim 1, the hardware processor to further execute the computer-executable instructions to:

determine one or more features in the first image data;

generate a first set of local descriptor values for the one or more features in the first image data;

determine one or more features in the second image data;

generate a second set of local descriptor values for the one or more features in the second image data; and calculate a maximum over an inner product of the first set of local descriptor values and the second set of local descriptor values.

5. A system comprising:

a memory, storing computer-executable instructions; and a hardware processor to execute the computer-executable instructions to:

access image data of an inventory location;

determine an item represented in the image data;

determine a first score indicative of a similarity between the item represented in the image data and a type of item associated with at least a portion of the inventory location;

determine a candidate item type set of one or more possible types of items that are associated with a particular user account and excluding the type of item associated with the at least a portion of the inventory location;

determine a set of second scores, each second score indicative of a similarity between the item represented in the image data and a corresponding one of the one or more possible types of items in the candidate item type set;

determine one of the set of second scores indicative of greatest similarity between an associated possible type of item and the item represented in the image data; and determine a third score based on the first score and the one of the set of second scores indicative of greatest similarity, wherein the third score is indicative of a likelihood the item is correctly placed at the at least a portion of the inventory location.

6. The system of claim 5, wherein the image data comprises a first image acquired at a first time and a second image acquired at a second time, and further wherein the computer-executable instructions to determine the item represented in the image data further comprising computer-executable instructions to:

determine data indicative of a difference between the first image and the second image;

determine an area of the second image associated with the difference;

access item data associated with a type of item designated as stowed at the at least a portion of the inventory location associated with the area, wherein the item data is indicative of a width and depth of the type of item;

process the area of the second image using a classifier to determine a front of an item at the inventory location;

determine a region of interest (ROI) within the area based on a position of the front of the item and the width and depth of the type of item; and designate the ROI as the item represented in the image data.

7. The system of claim 5, wherein the candidate item type set comprises one or more types of items for which a quantity of at least one item is in custody of a user represented by the particular user account.

8. The system of claim 5, the hardware processor to further execute the computer-executable instructions to:

access a threshold value;

compare the third score to the threshold value;

determine the item was incorrectly placed at the at least a portion of the inventory location based on the comparison; and initiate a mitigation action to correct the incorrect placement.

9. The system of claim 5, wherein the determination of the first score indicative of the similarity between the item represented in the image data and the type of item associated with the at least a portion of the inventory location is free from identification of the item represented in the image data.

10. The system of claim 5, further comprising a weight sensor at the inventory location and the hardware processor to further execute the computer-executable instructions to:

determine a change in weight at a first time based on weight data acquired from the weight sensor, wherein the change exceeds a threshold value;

determine a first image acquired at or before the first time;

determine a second image acquired after the first time; and wherein the image data comprises the first image and the second image.

11. The system of claim 5, the hardware processor to further execute the computer-executable instructions to:
determine the third score is below a threshold value;
determine occurrence of a first subsequent event associated with the inventory location; and
based at least in part on the determination that the third score is below the threshold value, designate information associated with the first subsequent event as having a low confidence value.

12. The system of claim 11, the hardware processor to further execute the computer-executable instructions to:
generate instructions to an attendant to change placement of the item at the at least a portion of the inventory location;
receive data that is indicative of the item being correctly placed at the at least a portion of the inventory location by the attendant;
determine occurrence of a second subsequent event associated with the inventory location, wherein the second subsequent event occurs after the first subsequent event; and
designate the information associated with the second subsequent event as having a high confidence value.

13. The system of claim 5, the hardware processor to further execute the computer-executable instructions to:
determine one or more features in first image data using a scale-invariant feature transform (SIFT) algorithm;
generate a first set of local descriptor values for the one or more features in the first image data using the SIFT algorithm;
determine one or more features in second image data using the SIFT algorithm;
generate a second set of local descriptor values for the one or more features in the second image data using the SIFT algorithm;
determine data indicative of one or more differences between the first set of local descriptor values and the second set of local descriptor values; and
based on the data indicative of one or more differences, generate data indicative of a similarity between the first image data and the second image data.

14. A method comprising:
accessing image data of at least a portion of an inventory location;
determining an item represented in the image data;
determining a first score indicative of a similarity between at least a portion of the item represented in the image data and a type of item associated with the inventory location;
determining a candidate item type set of one or more possible types of items that are associated with a particular account, wherein the candidate item type set excludes the type of item associated with the inventory location;
determining a set of second scores, each second score indicative of a similarity between the item represented in the image data and one of the one or more possible types of items in the candidate item type set;
determining one of the second scores that is indicative of greatest similarity between the one of the one or more possible types of item and the type of item represented in the image data; and
determining a third score based on the first score and the one of the second scores that is indicative of greatest similarity, wherein the third score is indicative of correct placement of the item at the inventory location.

15. The method of claim 14, wherein the one or more possible types of items that are associated with the particular account comprise those types of items for which a quantity of at least one item is stowed at a tote associated with the particular account.

16. The method of claim 14, further comprising:
accessing a threshold value;
comparing the third score to the threshold value;
based on the comparing, determining the item represented in the image data is designated for stowage in a second inventory location; and
initiating a mitigation action to move the item to the second inventory location.

17. The method of claim 14, wherein the determining the first score indicative of the similarity between the at least a portion of the item represented in the image data and the type of item associated with the inventory location is free from identification of the item represented in the image data.

18. The method of claim 14, further comprising:
determining occurrence of an event at a first time based on one or more of weight data, image data, or automated facing unit data; and
wherein the image data comprises a first image acquired prior to the first time and a second image acquired after the first time.

19. The method of claim 14, further comprising:
determining the third score is below a threshold value;
determining occurrence of an event associated with the inventory location; and
designating information associated with the event as having a low confidence value.

20. The method of claim 14, wherein at least a portion of the determining the first score and the determining the set of second scores occur at least in part in parallel with one another.

21. A method comprising:
accessing image data of an inventory location;
determining a first score indicative of a similarity between at least a portion of an item represented in the image data and a type of item associated with the inventory location;
determining a candidate item type set of one or more possible types of items, wherein the candidate item type set excludes the type of item associated with the inventory location;
determining a set of second scores, each second score indicative of a similarity between the item represented in the image data and one of the one or more possible types of items in the candidate item type set;
determining a second score from the set of second scores indicative of greatest similarity between the item represented in the image data and the one of the one or more possible types of items in the candidate item type set; and
determining a third score, based on the first score and the second score, that is indicative of placement of the item represented in the image data at the inventory location.

22. A method comprising:
determining first data indicative of a similarity between at least a portion of an item represented in image data and a type of item associated with an inventory location;
determining a first set of one or more possible types of items, wherein the first set excludes the type of item associated with the inventory location;

determining second data indicative of a similarity between the item represented in the image data and one of the one or more possible types of items in the first set;

determining third data indicative of greatest similarity between the item represented in the image data and the one of the one or more possible types of items in the first set; and determining fourth data indicative of placement of the item represented in the image data at the inventory location.

\* \* \* \* \*